May 26, 1959 L. A. SPIEVAK 2,887,936

TYPE COMPOSING APPARATUS

Filed Oct. 20, 1953

11 Sheets-Sheet 1

LOUIS A. SPIEVAK
INVENTOR.

BY Knight & Rodgers
ATTORNEYS

May 26, 1959 L. A. SPIEVAK 2,887,936

TYPE COMPOSING APPARATUS

Filed Oct. 20, 1953

11 Sheets-Sheet 2

LOUIS A. SPIEVAK
INVENTOR.

BY Knight + Rodgers
ATTORNEYS

May 26, 1959 L. A. SPIEVAK 2,887,936
TYPE COMPOSING APPARATUS
Filed Oct. 20, 1953 11 Sheets-Sheet 3

LOUIS A. SPIEVAK
INVENTOR.
BY Knight + Rodgers
ATTORNEYS

May 26, 1959 L. A. SPIEVAK 2,887,936

TYPE COMPOSING APPARATUS

Filed Oct. 20, 1953

11 Sheets-Sheet 4

LOUIS A. SPIEVAK
INVENTOR.

BY Knight + Rodgers
ATTORNEYS

May 26, 1959 L. A. SPIEVAK 2,887,936

TYPE COMPOSING APPARATUS

Filed Oct. 20, 1953

11 Sheets-Sheet 5

LOUIS A. SPIEVAK
INVENTOR.

BY Knight & Rodgers
ATTORNEYS

May 26, 1959 L. A. SPIEVAK 2,887,936

TYPE COMPOSING APPARATUS

Filed Oct. 20, 1953 11 Sheets-Sheet 6

LOUIS A. SPIEVAK
INVENTOR.

BY Knight & Rodgers
ATTORNEYS

May 26, 1959

L. A. SPIEVAK 2,887,936

TYPE COMPOSING APPARATUS

Filed Oct. 20, 1953

11 Sheets-Sheet 7

LOUIS A. SPIEVAK
INVENTOR.

BY Knight & Rodgers

ATTORNEYS

May 26, 1959

L. A. SPIEVAK 2,887,936

TYPE COMPOSING APPARATUS

Filed Oct. 20, 1953

11 Sheets-Sheet 8

LOUIS A. SPIEVAK
INVENTOR

BY Knight & Rodgers
ATTORNEYS

May 26, 1959 L. A. SPIEVAK 2,887,936

TYPE COMPOSING APPARATUS

Filed Oct. 20, 1953 11 Sheets-Sheet 9

LOUIS A. SPIEVAK
INVENTOR.

BY

Knight & Rodgers
ATTORNEYS

May 26, 1959

L. A. SPIEVAK 2,887,936

TYPE COMPOSING APPARATUS

Filed Oct. 20, 1953

11 Sheets-Sheet 10

LOUIS A. SPIEVAK
INVENTOR.

BY Knight & Rodgers
ATTORNEYS

May 26, 1959 L. A. SPIEVAK 2,887,936

TYPE COMPOSING APPARATUS

Filed Oct. 20, 1953 11 Sheets-Sheet 11

LOUIS A. SPIEVAK
INVENTOR.

BY Knight & Rodgers
ATTORNEYS

United States Patent Office 2,887,936
Patented May 26, 1959

2,887,936

TYPE COMPOSING APPARATUS

Louis A. Spievak, Los Angeles, Calif.

Application October 20, 1953, Serial No. 387,287

25 Claims. (Cl. 95—4.5)

The present invention relates generally to the type setting art and to means for producing justified lines of type characters of non-uniform width, arranged in columns. More specifically, this invention relates to means of this character for use in conjunction with and operative from a keyboard such as is found in an ordinary typewriter to produce images or impressions of the characters on a sheet, as for example a light-sensitive film, which is then used in known processes for printing.

It is a general object of my invention to provide a new kind of type setting machine that overcomes several disadvantages of known machines. Linotypes are large, heavy, noisy machines that require long training to use and do not present favorable working conditions when compared with many other office jobs. This factor alone has created something of a labor problem in obtaining skilled operators for these machines. Accordingly, it is an object of my invention to provide a type setting machine that is comparatively small in size, quiet in operation, and can be operated from an ordinary typewriter so that anyone who is a typist can, with little additional instruction, learn to operate the machine and compose material to be printed. Also, a machine of this character can be operated in more comfortable and pleasant surroundings than has heretofore been possible.

It is also an object of this invention to provide a coding system whereby one or more complete lines of composition can be set up and stored along with an independent justification for each line, after which the line can be justified as it is projected on to the light-sensitive film or other sheet material. This makes it possible to effect justification of a line of typed material after the length of the line has been determined and without delaying the operation of setting up the next line of type with the advantageous result that the typewriter and the coding system can be operated practically continuously.

Another object of the invention is to provide novel justifying means that is simplified by making it of a selective type rather than of a calculating type. Such a justifier has within it a plurality of members each representing precalculated values for justification of a line of type and the justifier operates to select the proper one of these members as the required information is presented to the justifier. These values in the form of actual distances, are then taken out of the justifier.

Another object of my invention is to provide a movable matrix of simplified design and of extremely small mass and inertia so that the matrix can be rapidly moved and/or indexed to any one of a number of positions by forces of very small magnitude, thus adapting the matrix to either mechanical or electrical operation and also insuring accuracy of positioning and speed of movement.

Another object of my invention is to provide a novel matrix of very simple construction so that it may be manufactured at very low cost, thus enabling a number of fonts of characters to be acquired cheaply. This simplicity of construction makes it possible to exchange a complete matrix for another one in the machine with ease and in a short time in order to change the fonts of characters. The low cost of the matrix presents a very great advantage over known type setting machines in which the cost of acquiring an adequate supply of different fonts may exceed the cost of the machine itself because of the expense of a single font.

A further object of my invention is to use the movement of the key bars and the carriage in the typewriter as the source of power for motivating a portion at least of the type setting machine, and particularly the unit in which the coded signals are stored in direct response to operation of the typewriter.

Another object of my invention is to provide a type composing machine of this character having means to compensate for various changes in the size and width of characters that are introduced into the composition when the type size or font is changed. By introducing means to compensate for these changes in width, the machine is made much more flexible since it is not limited to one specific size of character or font but permits the machine to be changed over as required by merely manipulating a few simple controls.

Another object of my invention is to provide means which continuously records the position in the line of composition being set from the typewriter in order to continuously indicate to the operator the size of the unused portion of the line, and which makes this recording accurately for characters of different widths and lines of different lengths.

It is also an object of my invention to provide such a means for continuously indicating the size of the unused portion of the line which achieves a high degree of accuracy by magnification of the movement through the terminal portion only of the line. This feature makes possible a smaller recording and indicating apparatus since it is not necessary that the entire line be magnified in this manner; but by magnifying only the terminal portion of the line, the desired accuracy is obtained within the area where it is needed.

Another object of the invention is to provide type setting mechanism in which the various components are grouped into packaged units that are quickly and easily replaced in order to remedy mechanical breakdowns and failures; and in which the power units are duplicates of each other in order to achieve simplicity and economy in manufacture nad maintenance of the apparatus.

A still further object of the invention is to provide type composing apparatus of the character described in which physical movements of various members, as for example members involved in storing signals and subsequently reading the stored signals, are so easily performed that they may be accomplished by direct mechanical thrusts or impulses as well as by electrically transmitted impulses without any appreciable sacrifice in speed of response.

The above and other objects of my invention are attained in apparatus which is used in conjunction with an ordinary typewriter having a standard key board and key bars and also having the usual moving carriage. Associated with the typewriter in a position to be actuated by the key bars, is means for originating and transmitting code signals which are different for each key bar. Basically, each signal is a unique combination of impulses, either mechanical or electromechanical which can position a plurality of members to store these signals for a short period of time. In a preferred embodiment, a bank of code switches is located beneath the key bars so that each time a key bar is depressed, a unique combination of electrical contacts is made with the resultant transmission of a code signal consisting of a combination of electrical impulses.

These impulses are transmitted to means for receiving and recording or storing the code signals which represent the characters in a line of composition. Such means, termed herein a memory unit, includes a storage disk which is rotated by and in synchronism with the movements of the typewriter carriage and which receives and stores the signals in physical form by setting a plurality of pins. These pins are physically positioned by solenoids or other means responsive to the individual impulses. The positions of these pins on the rotating disk are subsequently read as the disk with the stored signals on it rotates to move the pins past the position of the reading means. The result is that there is transmitted another or second set of similar impulses or signals, the effect being a repetition of the original signals in the same code form.

A convenient means for transmitting the impulses and setting the pins is electric circuit means including a plurality of solenoids adapted to position individual pins. Accordingly the reading means is a plurality of electric switches spaced from the solenoids to be engaged by the pins after a predetermined angular movement of the disk. There is a lapse of time between the receipt and retransmission of the signals caused by the predetermined movement of disk, which time lapse permits introduction into the transmitted signals of additional signals for any special purpose; or it is here used to permit determination of the length of a line of composition so that justification of the line of composition can be carried out.

The new signals sent out from the signal storage or memory unit are preferably a repetition of the original signals and are transmitted to a matrix carrying one or more fonts of characters where the signals index or control orientation of the matrix. In a preferred form of invention, the signals themselves, without decoding, are converted directly into movement of the matrix which brings successive characters on the matrix into a predetermined position where a light beam passing through the matrix causes a reproduction of the character on the matrix to appear on a light-sensitive film. In this embodiment, the code signals perform both the functions of indexing and moving the matrix; but it is within the scope of my invention to separate these functions.

The light beam is fixed in its position while the film or other sheet material which is to receive the reproduction of the characters from the matrix is mounted on a carriage which moves linearly with respect to the light beam by distances which are varied according to the widths of the characters. This movement arranges the images of successive characters in a line of composition. Means are also provided for advancing the film with respect to the carriage to produce a relative movement of the film and light beam at right angles to the first movement. The second movement is in such a direction as to place successive lines under one another to arrange the lines in a column on the film. Means are also provided for varying the amount that the film is advanced on the carriage so that distance between successive lines can be varied as required.

Signals indicating the width of the successive characters and of the spaces between words are transmitted to a line-length gauge where these are totaled to indicate to the operator progress through a line of composition. In this way the operator is kept constantly informed regarding the amount of the unused portion of the line. When that terminal portion of the line, herein termed the remainder, is reached within which a line is ordinarily ended by the operator, the line-length gauge sets into operation mechanism which magnifies the movement through this remainder area in order to obtain a greater accuracy.

Movement through this remainder portion is communicated to a justifier mechanism. The function of the justifier is to distribute the unused portion of the remainder among the several word spaces in the line of composition. A maximum number of word spaces in a line is arbitrarily assumed and then the justification for each word space is precalculated for each integral number of word spaces up to the assumed maximum number and this calculation is represented by a cam or similar member in the justifier. Means are provided to select the proper one of these cams according to the number of word spaces actually in the completed line, the selected cams being engaged by a reading member to read the value of the increments to be added to the individual word spaces to effect justification of the line. These increments are transmitted in the form of linear motion to the means for moving the film carriage where the increments are added to the basic movement of the film carriage equal to a normal space between words. Since this operation of justification is carried out after a complete line of characters is composed and stored, it is operationally independent of the act of setting up the next line of characters in the memory unit. Also, the operation of the typewriter to set up successive lines of composition may be carried on continuously by the operator without regard to this operation of justifying a previously composed line as said previously composed line is projected onto the film.

Movements of various parts of the apparatus are effected by novel power units able to produce linear movement of variable length. Several such units are supplied, each controlling one particular motion. Two units may be combined to produce two components of motion, as in the case of the matrix. Though alike in structure, these units are sufficiently flexible that they can produce different ultimate movements.

How the above objects and advantages of my invention, as well as others not particularly referred to herein, are attained will be better understood by reference to the following description and to the annexed drawings, in which.

Figure 7:
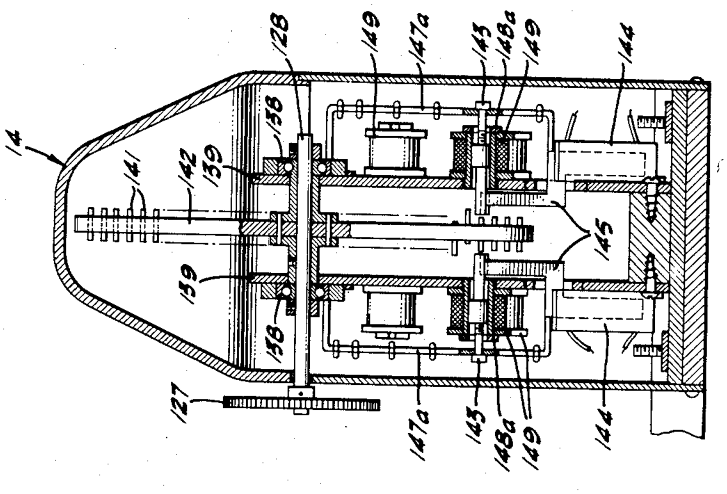
Fig. 7 is a vertical transverse section through the memory unit on line 7—7 of Fig. 6.
Figure 6:
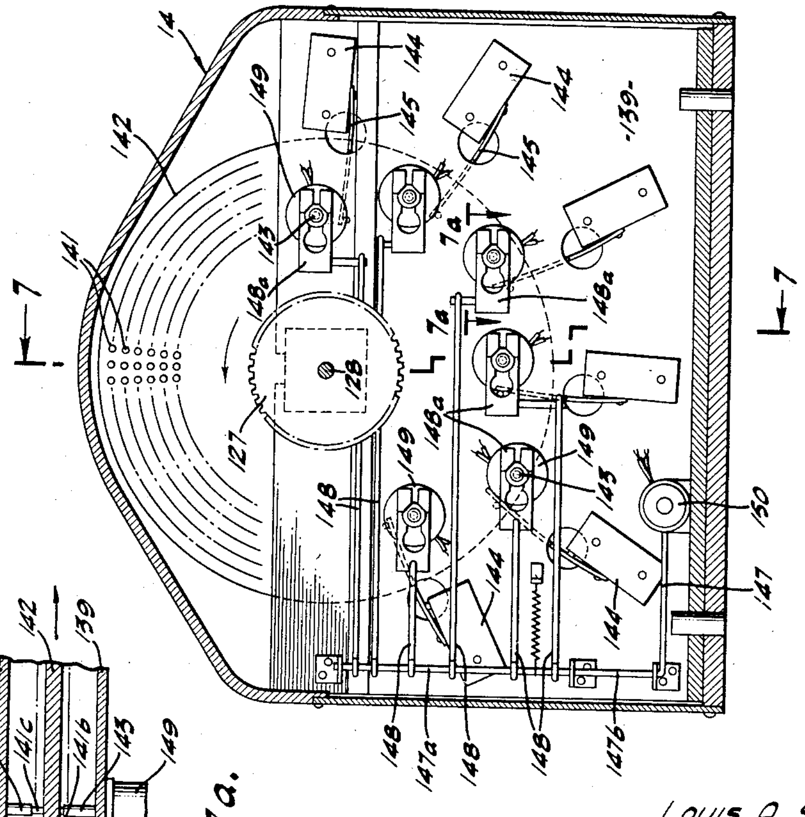
Fig. 6 is a vertical section through the memory unit on line 6—6 of Fig. 4.
Figure 7A:
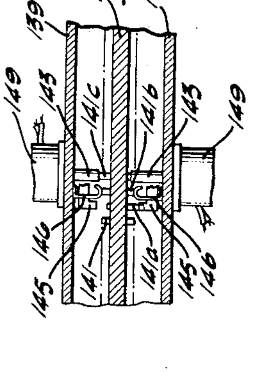
Figure 8:
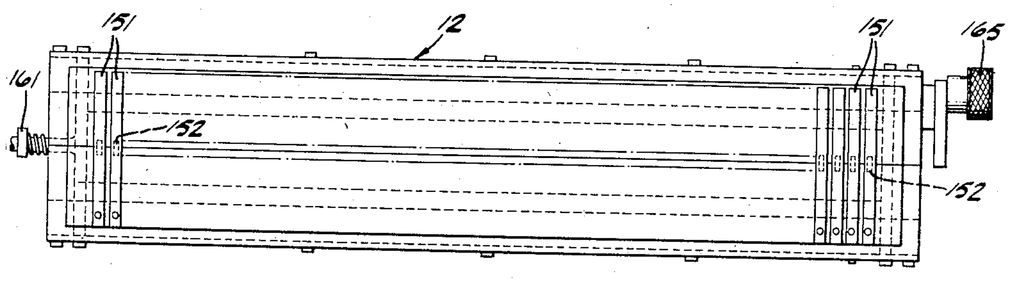
Figure 9:
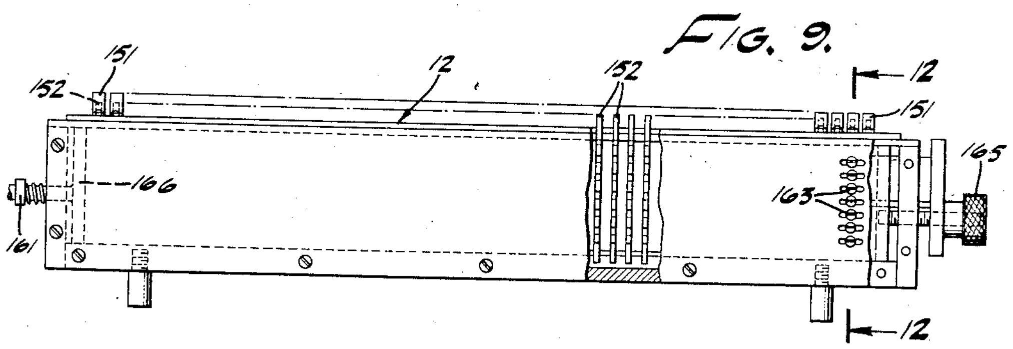
Figure 11:
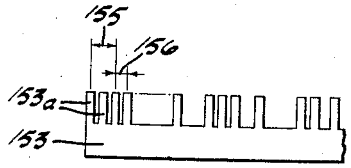
Figure 10:
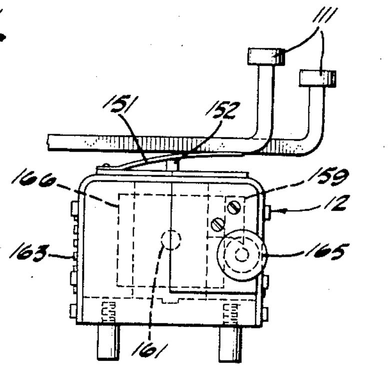
Figure 12:
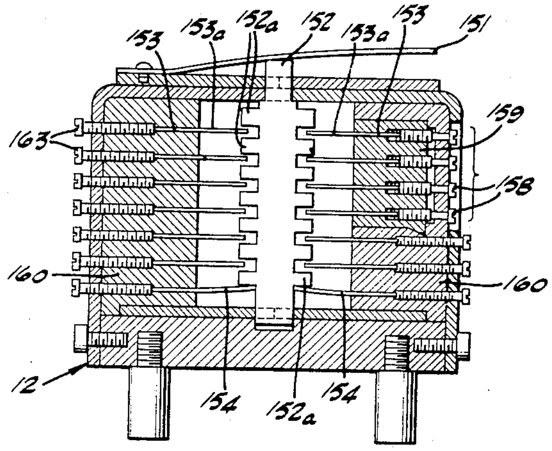
Figures 13, 14, 15:
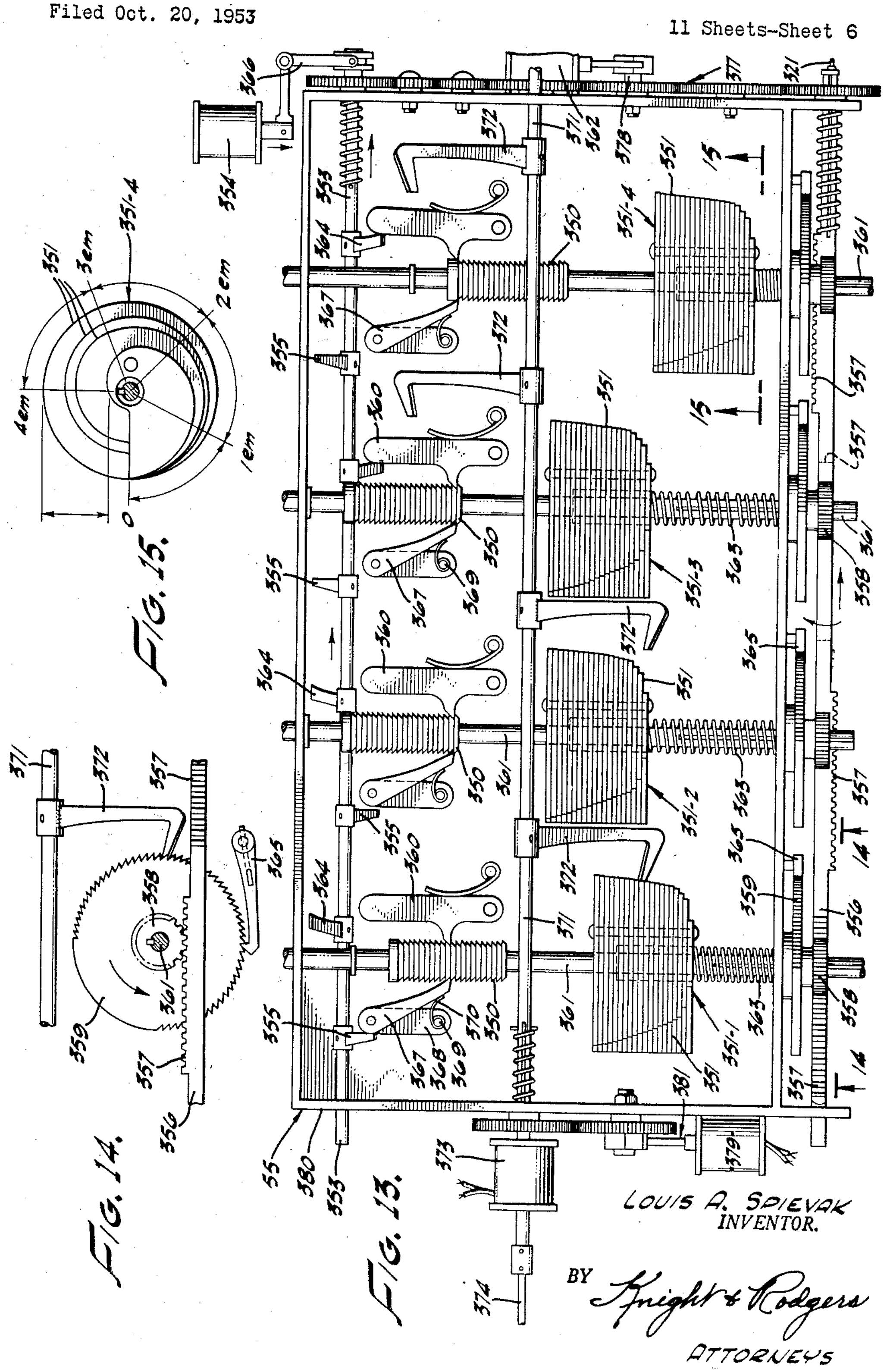
Figures 16, 17, 18, 19, 20:
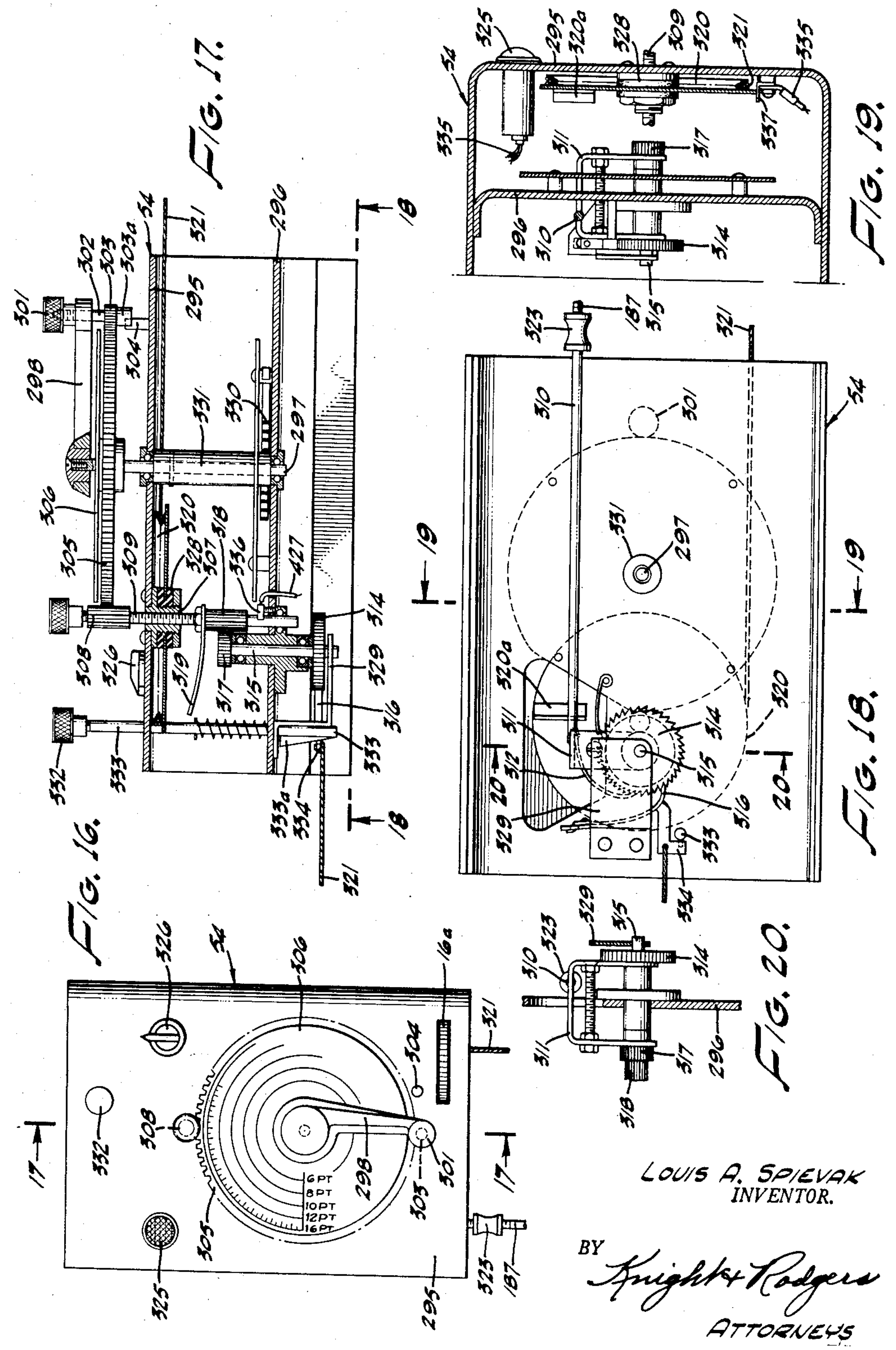
Figure 21:
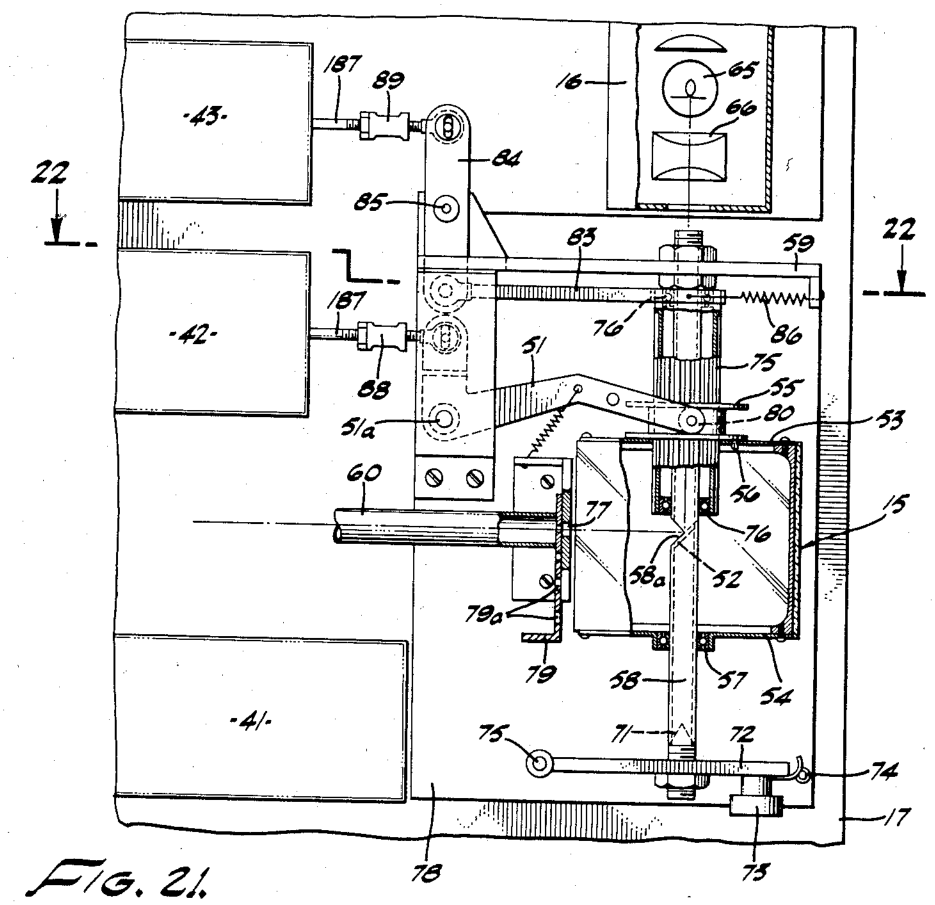
Figure 22:
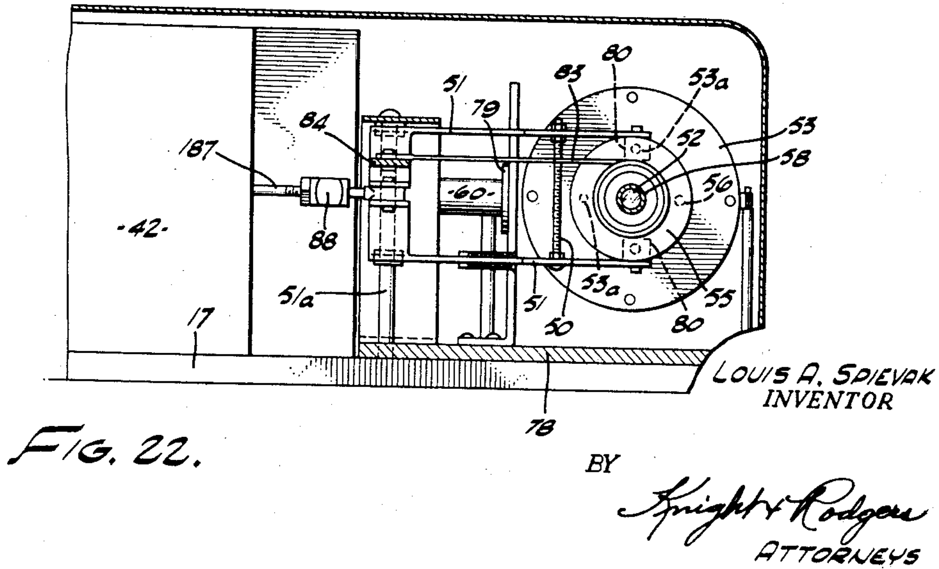
Figure 23:
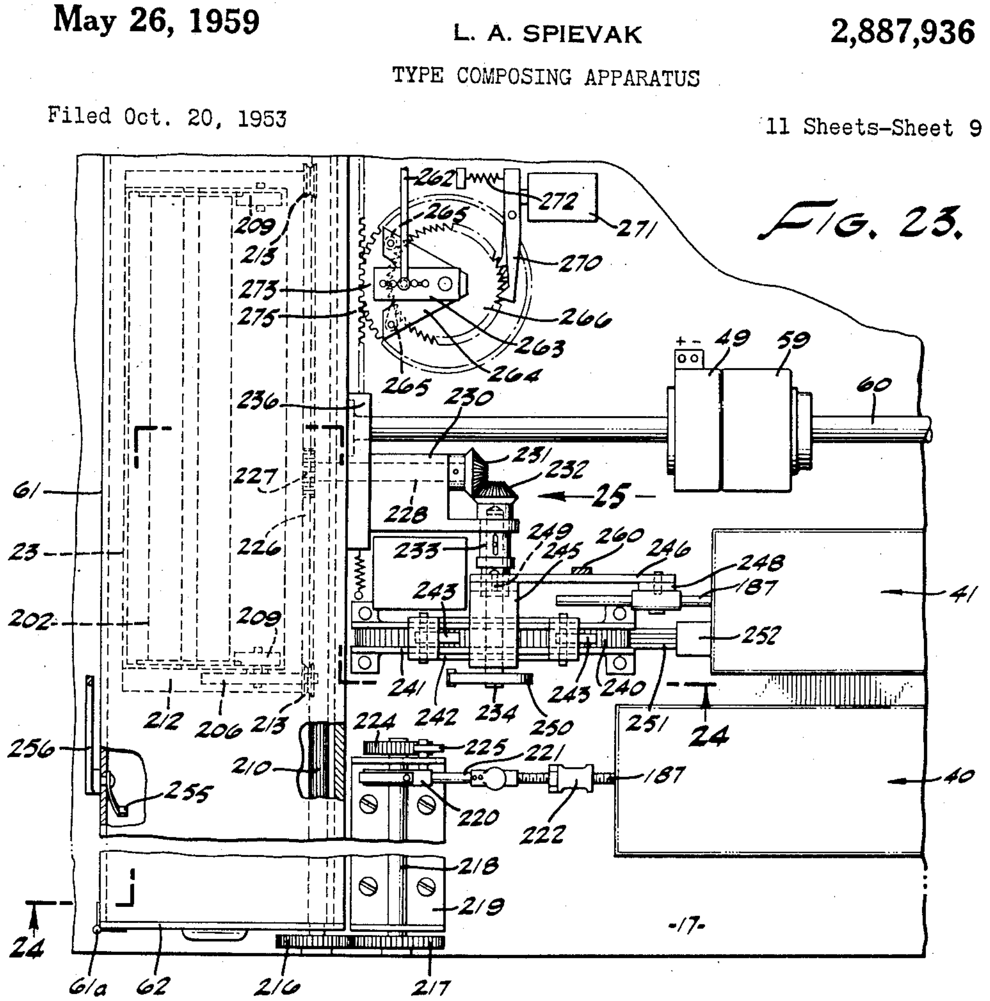
Figures 24, 25:
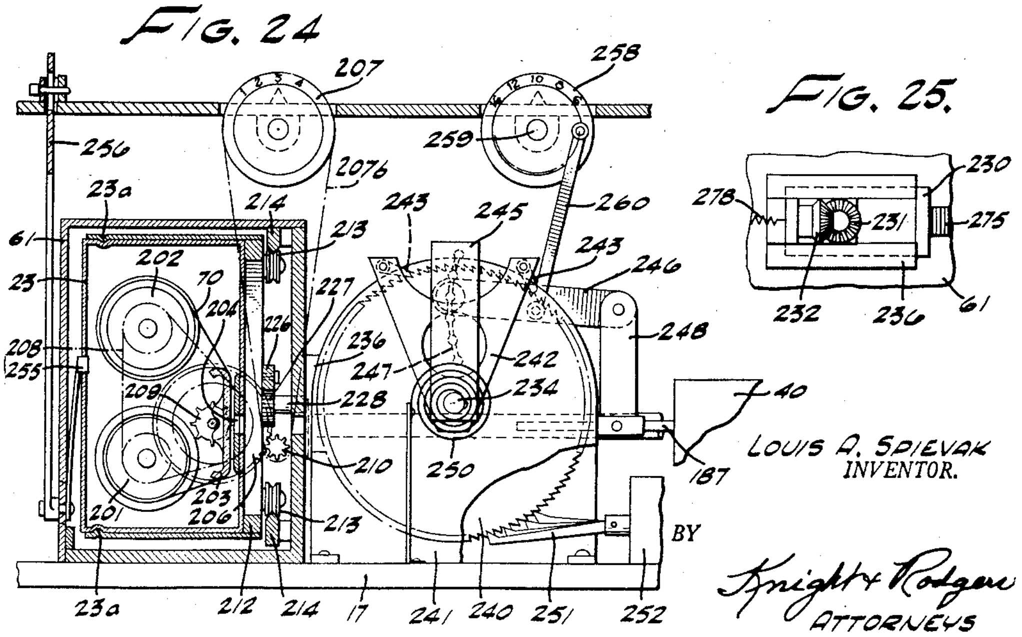
Figure 27:
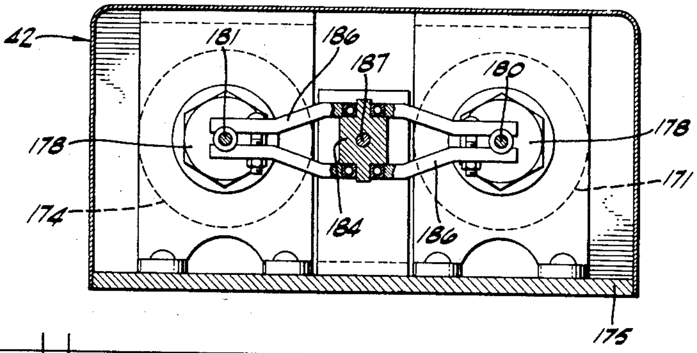
Figures 26, 28:
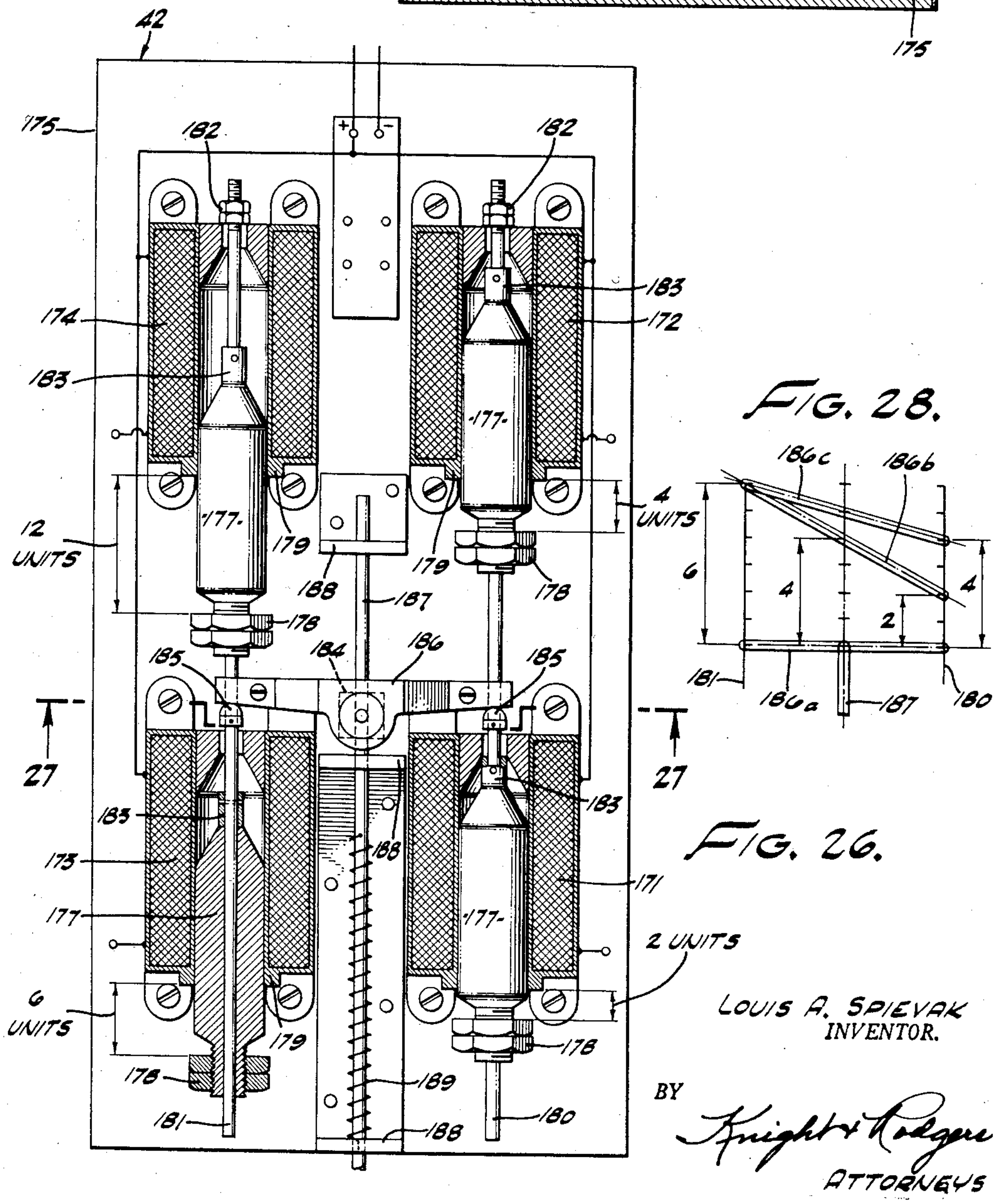

Fig. 7*a* is a fragmentary section on line **7*a*—7*a*** of Fig. 6;

Fig. 8 is a plan view of the electrical switch bank for originating coded electrical impulses;

Fig. 9 is a side elevation of the switch bank of Fig. 8;

Fig. 10 is an end view, viewed from the right hand end of Fig. 9 with the addition of typical key bars;

Fig. 11 is a fragmentary plan view of one of the code bars;

Fig. 12 is an enlarged vertical transverse section through the switch bank as on line 12—12 of Fig. 9;

Fig. 13 is a side elevation of the justifier with the cover plate removed;

Fig. 14 is a fragmentary bottom view as on line 14—14 of Fig. 13;

Fig. 15 is a bottom view of a stack of cam members on line 15—15 of Fig. 13;

Fig. 16 is a plan view of the line-length gauge;

Fig. 17 is a vertical median section on line 17—17 of Fig. 16;

Fig. 18 is a bottom view of the line-length gauge as indicated by arrows 18—18 in Fig. 17;

Fig. 19 is a transverse section on the line 19—19 of Fig. 18;

Fig. 20 is an enlarged fragmentary section on line 20—20 of Fig. 18 showing the gear train in the line-length gauge;

Fig. 21 is a plan view of the matrix and positioning mechanism, portions of the matrix and its mounting mechanism being broken away;

Fig. 22 is a mirror image of the transverse section on line 22—22 of Fig. 21;

Fig. 23 is a plan view of the film magazine and mechanism for actuating the film carriage;

Fig. 24 is a vertical section and elevation on line 24—24 of Fig. 23 through the film magazine and carriage showing a portion of the carriage operating mechanism in elevation;

Fig. 25 is a fragmentary elevation indicated by the arrow 25 in Fig. 23;

Fig. 26 is a horizontal median section through one of the variable actuator units with a schematic wiring diagram therefor;

Fig. 27 is a vertical transverse section on line 27—27 of Fig. 26;

Fig. 28 is a diagram showing various movements of parts within an actuator; and

Figure 29:
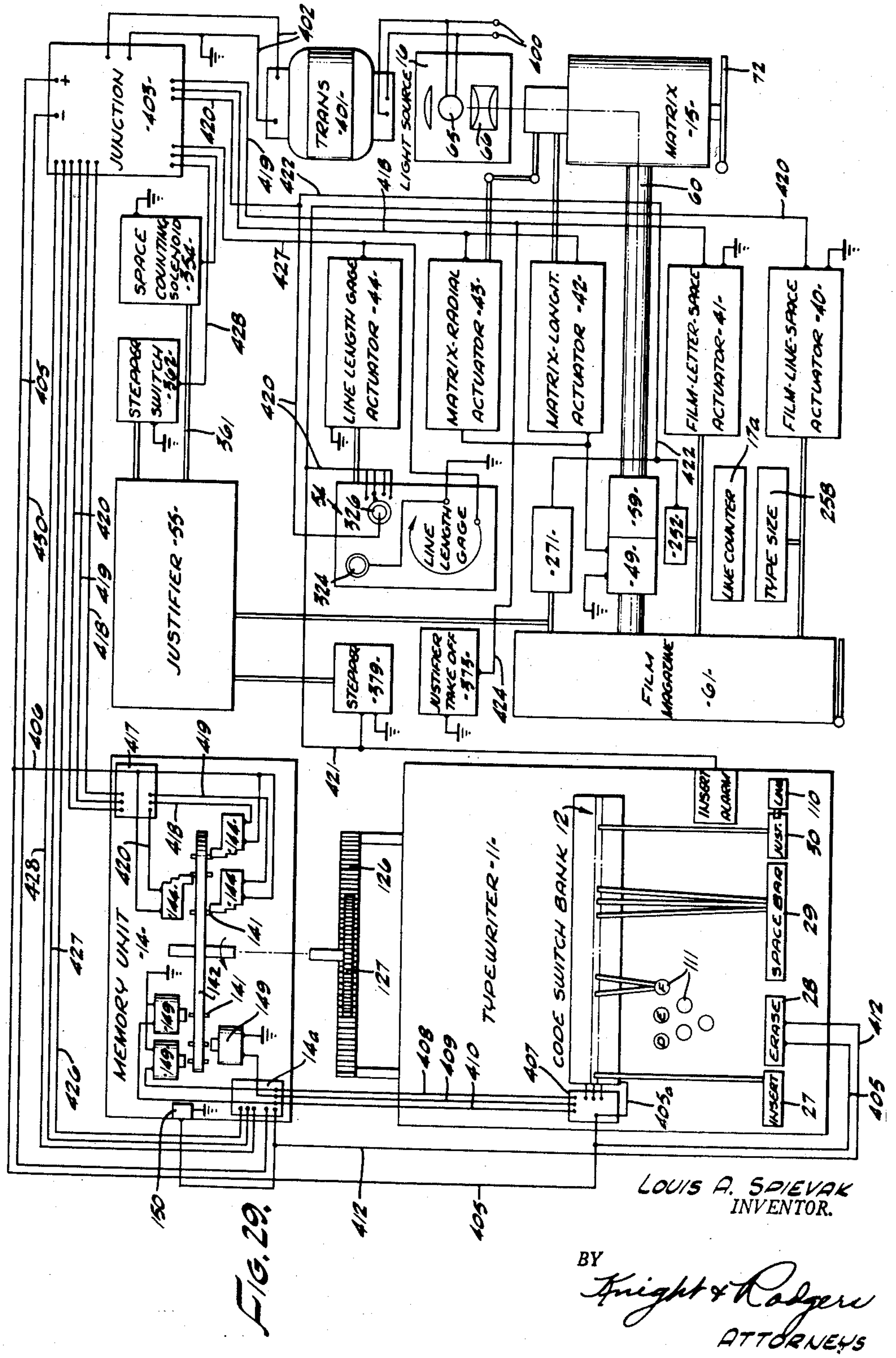

Fig. 29 is a combined block diagram and schematic wiring diagram of the photo-type composing apparatus of my invention, the diagram being simplified by omission of some wires which are repetitive and can be illustrated by one typical wire.

GENERAL OPERATION

Figure 1:
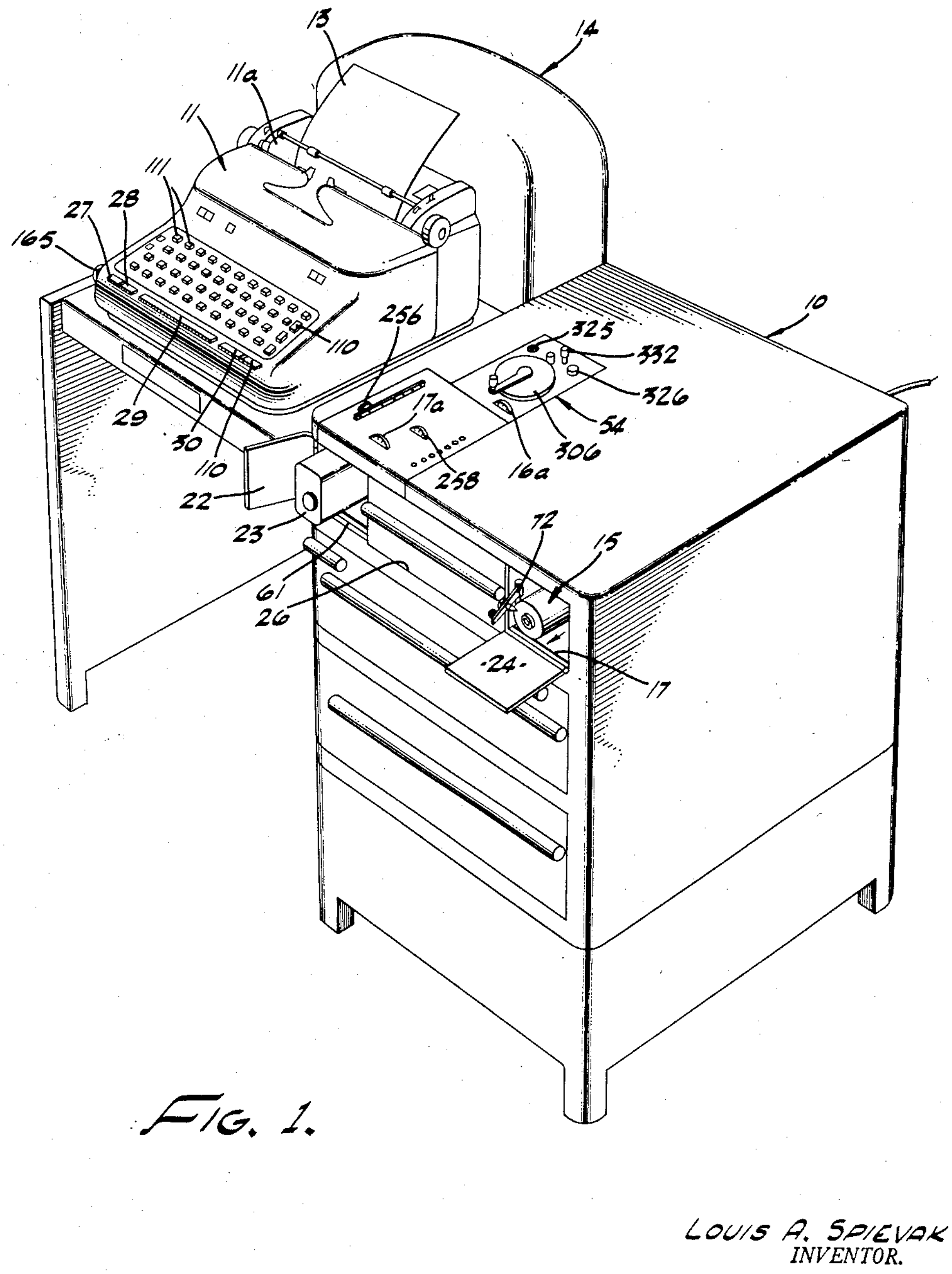
Fig. 1 is a perspective view of the cabinet housing a photo-type composing mechanism constructed according to my invention showing the relative position of the typewriter used with the mechanism, and the various manual controls.
Figure 2:
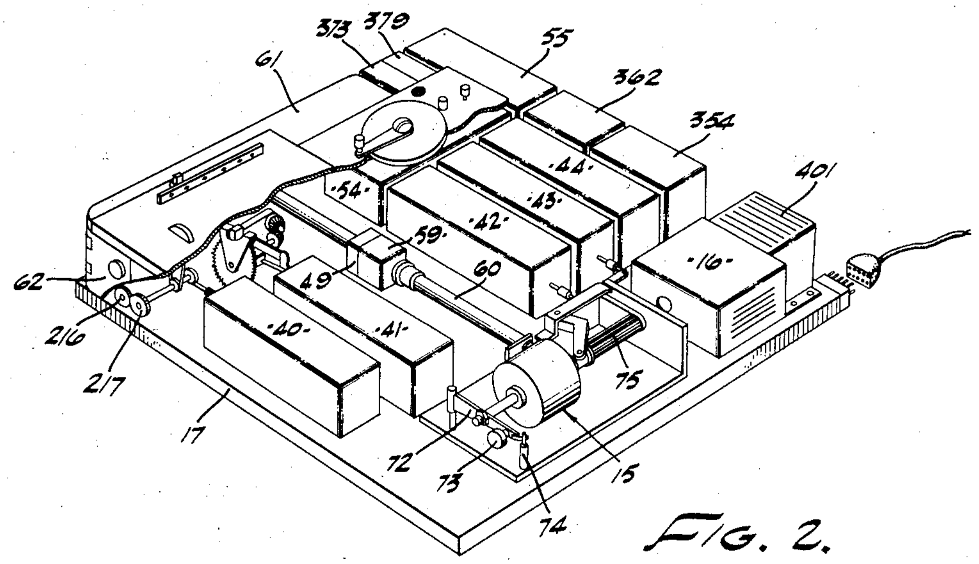
Fig. 2 is a perspective view of the assembly of reproduction and operating units mounted upon a base and adapted to be received in the upper right hand side of the cabinet shown in Fig. 1.

Referring now to the drawings, and more particularly to Figs. 1, 2, and 29, the general operation and arrangement of the major portions of my photo-type setting machine will be outlined. There is shown in Fig. 1 a cabinet generally indicated at 10 for enclosing some major elements of the machine and also for supporting typewriter 11 which is a part of the overall combination. Typewriter 11 is a standard typewriter having the usual carriage **11*a* and a standard keyboard operated in the conventional manner. However, the typewriter has been modified by the attachment thereto of certain special keys which are required for various functions of the photo-type setting machine and will be more fully described later. As the typewriter is operated in the usual manner by striking the keys of the key board, the type bars and keys of the typewriter are actuated in a known manner to print on paper sheet 13 a copy of the material to be composed in type by the photo-type setting machine. The copy on sheet 13** may be then used for purposes of proof-reading or the like.

As shown diagrammatically in Fig. 29, there is associated with typewriter 11 switchbank 12 of coding switches whereby the operation of the typewriter keys also sends out a series of coded signals. These coded signals are groups of electrical impulses representing characters in the type composition, and are received and stored in memory unit 14 for later use. The storage capacity of unit 14 is at least sufficient to store completely the longest line which may be composed in order that a complete line may be justified, as will be later described. Memory unit 14 subsequently acts to read or decode the stored signals and itself sends out a second set of coded signals, some of which are used to position matrix 15 which carries the font of type characters for printing. Signals in the form of electrical impulses from the memory unit for the purpose of selecting characters to be printed are actually sent to variable actuators 42 and 43 which, through suitable interconnecting mechanism, operate the matrix to position it. These variable actuators, like others used elsewhere, are a means for producing the instantaneous sums of the movements of several members in order to produce the variable movements required to position the matrix for printing the character on it.

A suitable optical system which includes a light source in housing 16 projects an image of a character on matrix 15 onto a light sensitive film 70 mounted on a suitable carriage within magazine 61. The motion of the carriage within magazine 61 is controlled by a two variable actuator units 40 and 41 which are in turn operated by electrical impulses received from memory unit 14.

A line length gauge 54 is provided to inform the operator of the amount of the line which remains unused in the current composition being typed on the typewriter and also when the remainder portion at the right hand end of the line is entered. Justifier 55 is provided in order to distribute automatically any unused part of the remainder portion among the several word spaces of the line in order to justify the line after typing. Justifier 55 is set into operation by the line length gauge and is connected mechanically to the film carriage in order to adjust it to the final spacing between words as is required to effect justification of the full line of composition.

*Typewriter and cabinet*

Returning now to the typewriter and to the cabinet as shown in Fig. 1, it will be seen that the typewriter 11 of conventional design is mounted at one side of cabinet 10 with memory unit 14 located behind the typewriter. For protection of the parts, all the reproducing and control units already mentioned are preferably mounted on a board or tray 17 which fits into cabinet drawer 26 that slides horizontally into the upper portion of cabinet 10 at the right hand side of the operator. In this position various operating controls are available either through the top surface of the cabinet 10 or through openings in the front of the cabinet. Thus at 22 and 24 are indicated doors which may be opened for access respectively to film magazine 61 and matrix 15.

In Fig. 1 it is shown how one matrix 15 may be removed for replacement by another one when door 24 is swung open and gate 72 carrying end pivot for the matrix axle is swung aside. The photo-sensitive film is another item in the machine which needs to be changed frequently and therefore warrants ready access. For this reason it is contemplated that film cartridge 23, which provides a light-tight enclosure for the film, can be inserted endwise into magazine 61, it being necessary for this purpose to also open door 62 (Fig. 2) at the end of the magazine closest to the operator. Between doors 22 and 24, the front portion of the cabinet is the front of a drawer indicated at 26. Such a drawer provides a simple means by which the tray with the unit assemblies mounted thereon may be moved into and out of the cabinet.

As mentioned above, it is convenient to mount upon typewriter 11 certain special keys that are frequently used since in this position these keys are easily available to the operator, although it will be realized that they may equally well be mounted in other positions adjacent the typewriter, as for example on the platform supporting the typewriter. Without necessarily limiting the number of these keys, there are indicated in Figs. 1 and 29 the following keys: insert key 27, erasing key 28, spacing key 29, justifying key 30, and new line key 110. The functions of these keys will be described in connection with other parts of the mechanism.

*Code switch bank*

There is shown in Figs. 8–12 the bank 12 of coding switches which translate each depression of a character key on the typewriter, and also certain special keys, into a coded signal consisting of a group of electrical impulses. Switch bank 12 has a generally rectangular housing which, as is shown diagrammatically in Fig. 29, is located underneath typewriter 11. The typewriter keyboard is provided with a plurality of conventional keys 111 which have horizontally extending bar portions that are pivotally attached to the the typewriter frame in a conventional manner which is therefore not shown in the drawings. As is shown in Fig. 10, switch bank 12 is located just beneath horizontally extending portions of keys 111. On top of the switch bank is a plurality of leaf springs 151. Each spring is riveted or otherwise attached at one end to the top surface of the switch bank housing while the other end of the leaf spring is spaced above the top surface of the switch bank and immediately beneath one of the keys 111. Each key 111 has a separate leaf spring 151 associated with it.

Inside the housing of switch bank 12 is a plurality of vertically movable cams or pins 152, one of which is shown in Fig. 12, there being one such pin immediately beneath and engageable with each spring leaf 151. Each pin 152 constitutes the movable switch contact for a plurality of switches, and is slidably mounted at each end in the upper and lower walls of the housing for switch bank 12. Each pin is preferably flattened (see Fig. 8) in order to hold the pin against rotation about its vertical axis. As shown best in Fig. 12, opposite sides of each pin 152 are each provided with a plurality of equally spaced notches which leave between them a plurality of outwardly extending contact arms 152*a*.

Along each side of switch bank 12 is an insulator block 160, the two blocks being spaced apart horizontally to receive pins 152 between them. Insulator blocks 160 are slotted longitudinally at spaced positions opposite the notches in pins 152; and code bars 153 are mounted one in each of these slots in the two insulator blocks. Each code bar 153 is a metallic, electrically conductive member, which is built much like a comb. It has a continuous base portion along one side and a series of small fingers or tabs 153*a* project away from the continuous base for a uniform distance. These tabs are the fixed contacts of a plurality of switches. Successive tabs 153*a* are uniformly spaced throughout the full length of the code bar as it is first made; but in operation certain selected tabs have been removed, as shown in Fig. 11, in order to establish the variations in the coded signals.

Code bars 153 are so spaced that the free outer ends of tabs 153*a* project into the slots or notches in the sides of each contact pin 152 but do not touch the pin when the pin is in the rest or raised position of Fig. 2. Each pin is normally held in this raised position by a pair of leaf springs 154 which engage the pin under the lowermost arm 152*a* and are mounted in insulator blocks 160 in the same manner as code bars 153.

A binding post 158 or 163 is screwed into one of the insulator blocks at each of the code bars 153 and leaf springs 154. These binding posts serve as a means for connecting to each of the code bars an electrical conductor. It will be understood that leaf springs 154 are in continuous contact with each pin 152 and form a common connection for the return portion of the electric circuit. Each finger 153*a* is normally out of contact with its associated pin 152; but when leaf spring 151 is depressed by a typewriter key, the spring moves its pin 152 downwardly, bringing arms 152*a* on the pin into contact with a tab 153*a* on one or more of the code bars. The total number of code bars 153 is here shown as being twelve, arranged in two groups of six at each side of the central row of pins 152. A greater or lesser number of code bars may be used as the occasion demands. Eight of these code bars are used to obtain code signals used in connection with printing characters, it being possible to obtain eighty-one different combinations of code signals using eight different code bars. The remaining four code bars give nine possible combinations for code signals which may be used for other functions in connection with composition, such as for controlling the movement of the film carriage according to the different widths of the different characters, or other special functions. These different code signals are obtained by eliminating selected tabs 153 so that as a pin 152 is depressed it makes its own unique combination of contacts with a group of fingers 153*a*, the combination being different for each of the pins 152. For printing a character, the contacts used are those made with any one or more of the group of eight code bars consisting of the six code bars at the left hand side of pins 152 in Fig. 2 and the bottom two code bars at the right hand side of pins 152.

An optional modification of the mounting of code bars 153 will now be described which permits the quick exchange of a portion only of the code bars for new ones without requiring any change in the remaining code bars. This is accomplished by making one of the insulator blocks 160 in two parts, as shown at the right hand side of Fig. 12 in which portion 159 of the insulator block is made to slide longitudinally of the main portion. The upper four code bars 153 are mounted on slide 159. Knob 165 is attached to slide 159 and may be grasped by the operator when changing a slide 159. To permit this relative motion between slide 159 and the stationary portion 160 of the insulator block, a slight change has been made in binding posts 158. These binding posts are of a split type in which one portion is carried by slide 159 and the other portion carried by stationary block 160, the two portions of the binding post slidably engaging each other to effect an electrical connection between them when slide 159 is properly positioned.

As mentioned above, it is contemplated that the upper four code bars in slide 159 on the right hand side of Fig. 11 are those which form code signals for spacing as required by the widths of different characters. Accordingly, a different series of code signals would be desired, when changing the font of characters by replacing matrix 15 with a new one. Otherwise the code signals remain unchanged as they determine the characters to be printed. Of course it will be realized that it is within the scope of my invention to mount a larger or smaller number of code bars on a slide, or to make an entire block 160 slidably removable for this same or other purposes.

In the conventional typewriter, lower case letters and numerals are all typed with carriage 11*a* in one position. Upper case letters and certain other characters are typed with the carriage in an alternate position relative to the type bars since each type bar carries two characters. For this reason, there are provided two tabs 153*a* on each code bar for each contact pin 152, there being one such contact pin for each key on the typewriter. The spacing between successive pins 152 is indicated at 155 in Fig. 11; and the interval between successive tabs 153*a* is one-half this distance, as indicated at 156. The two insulator blocks 160 are slidable within the housing of code switch bank 12 and are both attached at one end to a common plate 166 mounted on the end of plunger 161, as may be seen in Fig. 9. This plunger is connected in any suitable manner to the shift key of the typewriter with the result that when the shift key is actuated by the operator in order to print upper case letters, the two insulator blocks 160 are shifted longitudinally a distance equal to interval 156. This brings a second set of tabs 153*a* into registration with all the pins 152. Generally speaking, the number of positions which may be occupied by the code bars as a result of longitudinal movement with respect to pins 152 is the same as the number of positions of carriage 11*a* on the typewriter with respect to the type bars, or the same as the number of characters which are controlled or printed by each type bar of the typewriter.

*Memory unit drive*

The code signals which are originated within switch bank 12 go to memory unit 14 shown in Figs. 4–7 and which is located directly behind the typewriter in a position in which the memory unit may be drivingly connected mechanically to typewriter carriage 11a. This mechanical connection between the memory unit and the typewriter carriage synchronizes the advance and some return movements of the two devices. The memory unit 14 includes shaft 128 rotatably mounted with its axis horizontal and carrying on one end spur gear 127. Gear 127 meshes with and is driven by longitudinally extending rack 126 which is a part of a frame moved by carriage 11a of the typewriter. This frame is connected to the typewriter by structural supports 125.

The two supports 125 are fastened to a longitudinally extending bar 122. In each end of bar 122 is a post 123 upon which is mounted a compression spring 124. Slidably mounted on the lower ends of the posts 123 is rack 126, the rack being capable of limited vertical movement because of its sliding connection with posts 123 but normally being urged downwardly under pressure applied by compression springs 124. Rack 126 has rotatably mounted upon it a plurality of rollers 129 which normally ride upon the top surface of track 120 which extends parallel to and immediately below rack 126. The normal operational position of track 120 is such that rollers 129 riding on top of the track raise rack 126 to a position in which it meshes with the teeth of gear 127, shown in Figs. 4 and 5.

Track 120 is supported on the upper ends of two bars 117 each of which is pivotally connected at its lower end to a bell crank 116 and, at a point near its upper end, to a lever 118. Each bell crank 116 is pivotally mounted to a stationary post 131 located immediately behind typewriter 11. Each lever 118 is also pivoted at some point intermediate its ends to post 131 near the top of the latter member. Tension spring 119 is connected to the free end of each lever 118, the other end of spring 119 being attached to some fixed member. Thus the normal tension maintained in the two springs 119 pulls on levers 118 in the direction to lift supports 117 and track 120 into engagement between rack 126 and gear 127.

When desired, for reasons which will be explained, to disengage rack 126 from gear 127, track 120 is lowered by exerting a pull on rod 115. Rod 115 is connected to bell crank 116 and when tension is applied to the forward or right hand end of rod 115, when viewed as in Fig. 4, bell cranks 116 are rotated counterclockwise about their pivots, allowing track 120 to drop sufficiently that rack 126 disengages from spur gear 127. For this purpose, rod 115 is connected to lever 114 fastened to rock shaft 114a which is pivotally mounted beneath the keys of the typewriter keyboard. Shaft 114a is rocked by bent lever 113 which is rigidly attached at one end to the rock shaft, the other end of the bent lever being underneath and in engagement with key 110 on the typewriter keyboard. Key 110 is structurally similar to any of the conventional keys of the typewriter but has a new function and is called a new line key. When key 110 is depressed, the upper end of bent lever 113 is lowered, causing rock shaft 114a to rotate slightly in a counterclockwise direction and thus a pull is exerted on rod 115 which, as mentioned above, disengages rack 126 from drive gear 127 of the memory unit.

As will be further explained later, this disengagement of the rack with the drive gear of the memory unit occurs every time typewriter carriage 11a is returned to its starting position at the left hand end of the typewriter for a new line of composition, as is normal in typewriting operation. This avoids reverse movement of the parts within the memory unit, to be described. On return of the carriage to the starting position, key 110 is released, allowing movement of the various parts in the reverse direction to that given above so that rack 126 again engages drive gear 127 and movement of the memory unit is continued in what may be termed a forward direction.

*Memory unit*

Memory unit 14 located behind the typewriter (see Fig. 4) is a means for storing temporarily in physical form the code impulses which originate in the code switch bank. This memory unit is a means for receiving the coded electrical impulses, converting them into physical manifestations so that the signals can be stored for any desired length of time and then, in effect, recoding the signals by again sending out a second series of similar electrical impulses to appropriate elements of the type setting machine. The storage unit is memory disk 142 which is mounted upon shaft 128 to rotate therewith. Disk 142 is drilled with a plurality of holes in each of which is slidably mounted a short pin 141. Pins 141 are arranged in circular rows concentric with the axis of shaft 128 and the memory disk, and within each of these circular rows the pins are spaced at equal angular intervals around a full circle. As shown in Fig. 6, pins 141 are also arranged in radial rows, but the invention is not necessarily limited to this latter arrangement for reasons which will become evident.

Shaft 128 is journaled in bearings 138 of any suitable design which are mounted upon two spaced upwardly extending plates 139. Mounted upon each of the two plates 139 is a plurality of solenoids 149 each of which has an axially movable plunger 143 that is engageable with the pins 141 of one row in order to position these pins.

The number of plungers 143 is equal to the number of code bars in switch bank 12. There are a total of twelve code bars 153 and accordingly there are twelve plungers 143 and twelve solenoids 149 controlling the operation of these plungers individually. Plungers 143 are arranged in pairs, each pair being located at the proper radial distance with respect to shaft 128 to engage the pins 141 of one of the circular rows of pins. There being six pairs of plungers, the number of circular rows of pins 141 is limited to six in this embodiment. Because of the physical size of solenoids 149, it is impractical to arrange them all in a single line radially of the memory disk; and space for these several members is gained by arranging them at angularly spaced positions about drive shaft 128 and disk 142.

The six pairs of plungers 143 are in position to set or control the position of a pin 141 in each of the six rows of these pins. The pattern formed by the group of six pins in alinement with plungers 143 at any given position of the memory disk conforms to the arrangement of solenoids 149 as seen in Fig. 6.

The number of pins 141 in all circular rows is the same; and the number of pins in one row determines the maximum length of line of composition which this device can store at one time. In order to be able to store on the membory disk all of the characters of at least one complete line of composition, the total number of pins 141 in any given circular row is at least one more than the total number of spaces and characters which it is anticipated will occur in the line of composition of maximum length. It will be realized that, if shorter lines are composed, two or more entire lines may possibly be stored on the memory disk at one time.

Code impulses from switch bank 12 are stored on memory disk 142 by setting pins 141 to predetermined positions. Each of the twelve code bars 153 is connected electrically to one of the twelve solenoids 149. Accordingly, when electrical contact is established between a pin 152 and a code bar, the associated solenoid 149 is energized and plunger 143 of the solenoid is moved toward disk 142. At this moment the disk is stationary with a pin 141 in alinement with the solenoid plunger. The pin is in a neutral or intermediate position in which it projects equally beyond the two sides of disk 142 as at the top of the disk in Fig. 7. As the solenoid plunger advances, the pin is displaced endwise from the neutral position and slides in the disk so that it is disposed more towards one face of the disk than the other. For example, in the group of six pins shown at the bottom of the disk in Fig. 7, the top pin has been set by movement of the right hand solenoid and the second pin down has been set by movement of the left hand solenoid while the third pin in the row is in position to be set by movement of either solenoid. Of course, if neither one of the pair of solenoids at a given pin is energized, then the pin remains in its neutral position. Thus for coding purposes each pin 141 has a total of three positions, a neutral position and a position at either side of the neutral position. In ordinary operation, only one solenoid of a pair is energized so that a maximum of six impulses are recorded when a pin 152 is depressed.

After a pin has been set, disk 142 rotates in a counterclockwise direction as viewed in Fig. 6 to bring the next pin in each row opposite plungers 143. The gear ratio between rack 126 and spur gear 127 is such that the memory disk advances the angular distance between two successive pins in a circular row as typewriter carriage 11*a* advances one space.

The pins 141 after passing the solenoids which are adapted to set them, retain this set position for nearly a full revolution of disk 142. Shortly before each individual pin reaches its associated pair of plungers 143, the pin reaches a position where it can engage one of two operating arms 145 each attached to a microswitch 144, as shown in Fig. 6. Two separate operating arms 145 are positioned in corresponding positions, one on either side of disk 142, in order that a given pin, if it is displaced in either direction from the neutral position, contacts one of these operating arms and actuates the attached switch 144. There is one pair of such switches for each of the circular rows of pins 141, or a total of six pairs of such switches 144 in order to contact each of the six rows of pins.

The action of these switches and operating arms as the pins move past them in succession may be described as one in which the switches "read" the pins since they respond to the physical position of each pin which represents storage within the memory unit of one of the electrical impulses originated by the code switch bank. As a pin passes a switch arm 145, it causes movement of that arm which closes contacts within the corresponding microswitch and there is again initiated an electrical impulse which is a repetition of the original impulse which was stored in the memory unit. In order to generate and transmit these impulses, certain switches 144 are part of an electric circuit which also includes means for moving and positioning matrix 15 in response to electrical impulses transmitted through this circuit. Other switches are in electrical circuits for controlling the movement of the film carriage or for performing other functions.

In Fig. 7*a* there is shown a typical pin of any row in position 141*a* to be read by a switch arm 145. When the reading operation is completed, it is no longer necessary to maintain this pin in its displaced position but it is desirable to return it to a neutral position in order that it may be used again to store a code impulse in the memory unit. In order to neutralize the pin, a pair of spring cams 146 are fastened one to each of the two plates 139. One cam 146 is located at each side of disk 142, as shown in Fig. 7*a*, in a position to engage each pin of a given row after it passes switch arms 145 and before it reaches a position opposite solenoids 143. For example, if the pin is at 141*a* when it is read by switch arms 145, the next advance movement of disk 142 carries the pin to position 141*b* where it is neutralized by engagement with one of the neutralizing cams 146. After this, the next advance movement of disk 142 carries the pin to position 141*c* where it is in alinement with plungers 143 to be set again to store a new signal. Although the positions occupied by switch arms 145, neutralizing cams 146, and plungers 143 are spaced apart in Fig. 7*a* only by distances equal to successive advancing steps of the memory disk, it will be realized that they may be spaced farther apart if desired. However, each pin comes to these three elements in this sequence in order that it may be read, then reset to a neutral position, and finally displaced again; and then are separate reading means, pin neutralizing means, and pin displacing or setting means for each of the circular rows of pins 141 on disk 142. In Fig. 7*a*, the near plunger 143 is shown advanced to the extreme position as it displaces the pin at 141*c*. This is the position which corresponds to that shown for the second pin from the top in the group of pins at the bottom of the disk in Fig. 7.

If the operator strikes the wrong key, the error may be corrected by erasing from memory disk 142 that setting of pins 141. This is done by first back spacing the typewriter carriage to the wrong character, without disengaging rack 126 from gear 127 so that memory disk is turned backwards, and then depressing erase key 28 in front of the typewriter and thereby energizing two solenoids 150 located one at each side of the memory disk. Energization of a solenoid 150 causes movement of arm 147 which rotates the attached crank 147*a* about an axle located at 147*b*. A single piece of wire is bent to form all three members. This movement of crank 147*a* pulls rods 148 to the left as viewed in Fig. 6. Each of these pull rods 148 is connected to a plate 143*a* having in it a keyhole-shaped opening through which extends the outer end of a plunger 143. On the outer end of each plunger 143 is an enlarged head which, in normal operations, passes through the enlarged end of the keyhole opening to effect full range of plunger travel, all the stop plates normally being to the right from the positions shown so that the plunger is at the large end of the keyhole openings. When the plate is moved to the left, which is the position shown in Fig. 6, the narrow part of the opening is around the shaft of the plunger 143. The enlarged head, when the plunger moves toward the disk, engages the associated plate 143*a* to limit the inward travel of the plunger, as shown in Fig. 7. When erase key 28 is depressed it energizes both solenoids 150 so that all stop plates are positioned to limit travel of a plunger 143, as shown in Fig. 6, and it also energizes all solenoids 149 so that all twelve plungers 143 simultaneously advance towards pins 141. The travel of these solenoids is now limited to such an extent that the pins are returned to the neutral position, as shown in Fig. 7. Release of erase key 28 deenergizes solenoids 149 and 150, allowing the memory unit to operate normally. In this way the erroneous character is erased from the memory disk and subsequent operation of the typewriter stores the proper character on the memory disk.

*The matrix*

Matrix 15 carries all of the letters or other characters which can be included in the composition. Only a single font of characters is shown on the matrix herein, but it is designed to carry up to four fonts as it is within the scope of the invention to put more than one font of characters upon a single matrix. With four fonts, each one occupies less than one-fourth the surface of the matrix, measured around the circumference.

Figure 3:
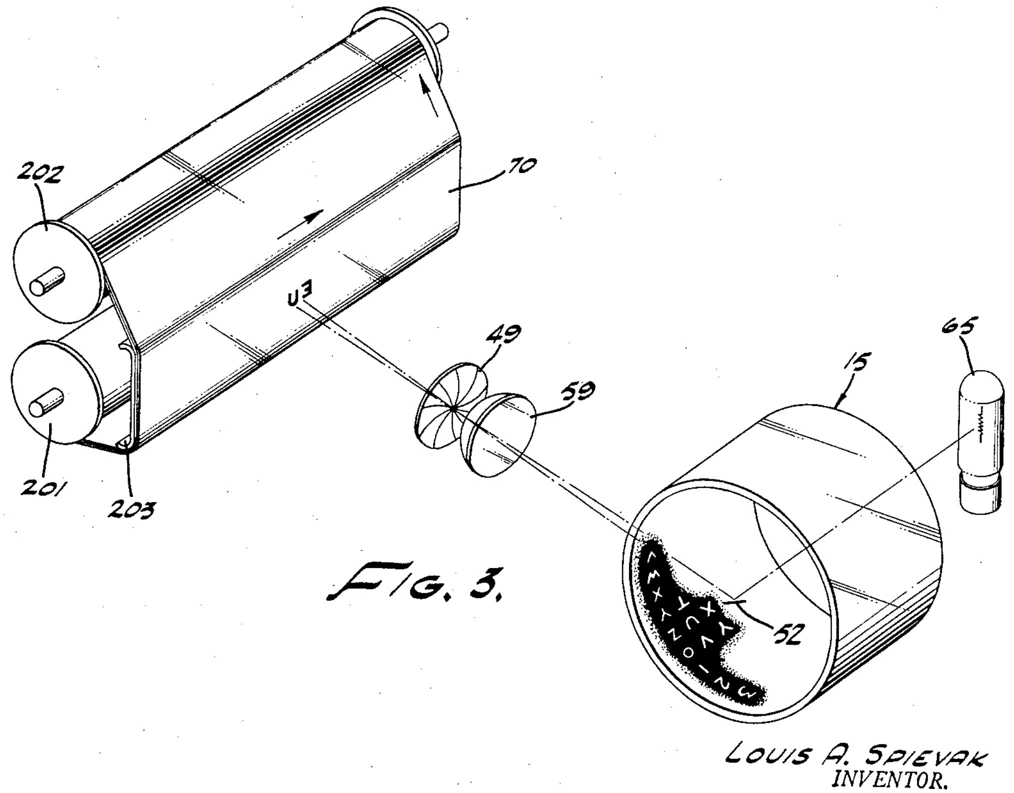
Fig. 3 is a diagrammatic view of the matrix and optical system for printing characters on film from the matrix.
Figure 4:
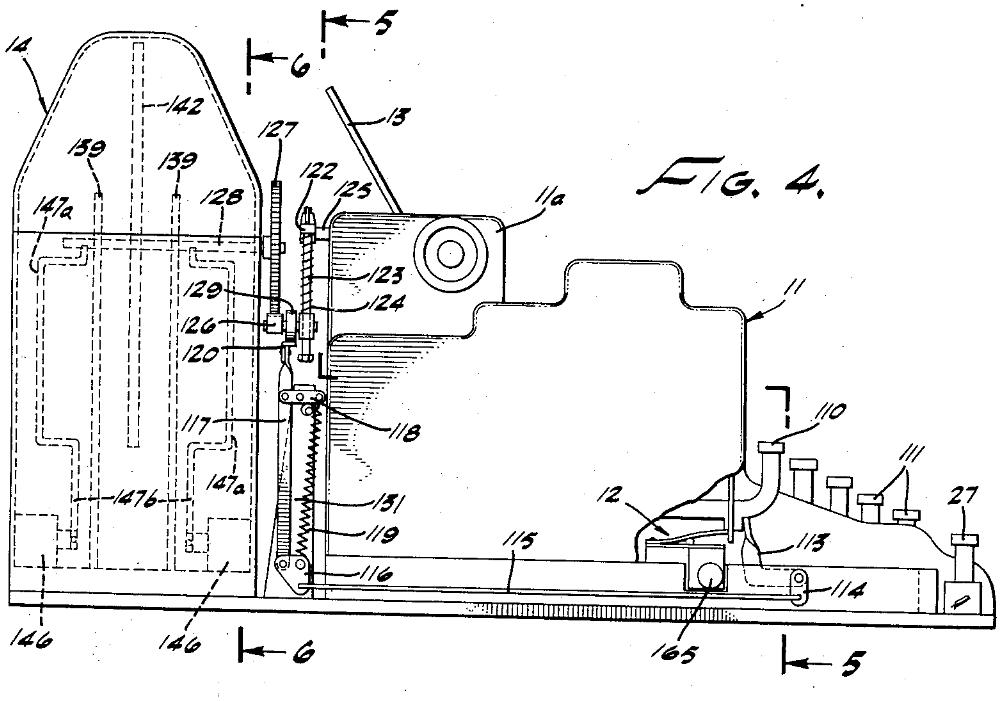
Fig. 4 is a side elevation of the typewriter and memory or storage unit only as viewed from the left of Fig. 1.
Figure 5:
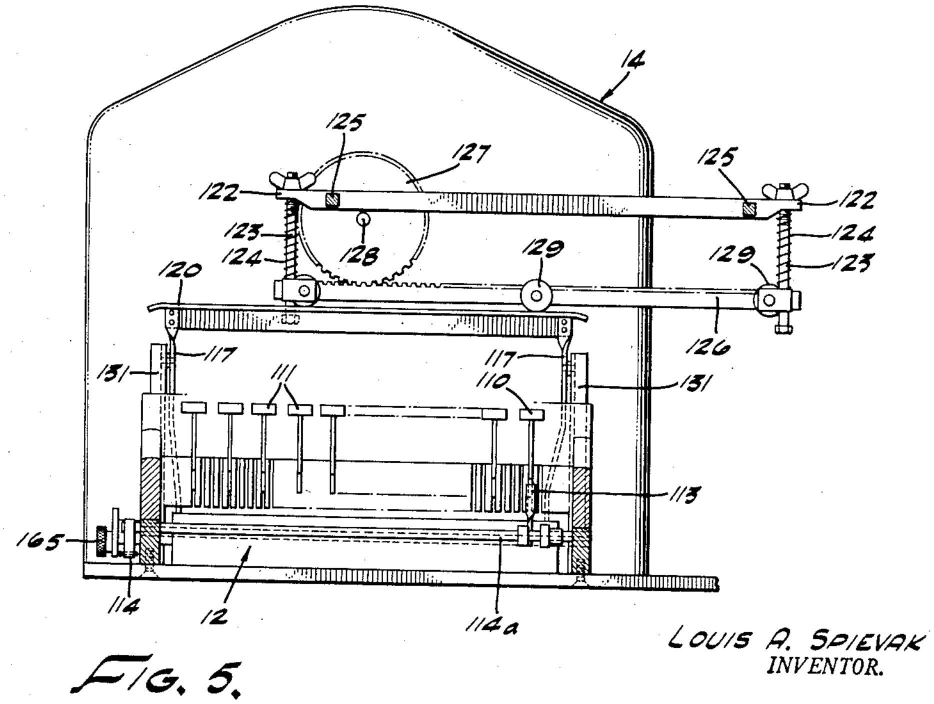
Fig. 5 is a vertical section and elevation on line 5—5 of Fig. 4 with a diagrammatic showing of the key bars of the typewriter.

The matrix shown in Figs. 21 and 22 comprises a drum with a cylindrical wall upon which the characters are carried. Typically, this cylindrical wall may be a film negative with all portions of the wall entirely opaque except for the portions which represent the several characters (Fig. 3). The cylindrical wall of the drum is fastened to end plates 53 and 54, one at each end of the drum, interconnected by suitable longitudinal ribs. These end plates and ribs are made of low-density metal in order to produce a matrix assembly which is very light in weight and therefore has a minimum of inertia since it must be moved rapidly and stopped accurately in any one of a number of positions.

Drum 15 is mounted to rotate about the axle 58. End plate 54 is mounted on bearing 57 which slides along tubular axle 58 while permitting the drum to rotate freely. The other end plate 53 is connected to spool 55 which is mounted upon sleeve 75 by a spline connection so that spool 55 can slide axially along sleeve 75 but rotates therewith. Sleeve 75 in turn is mounted to rotate about tube 58 by bearings at each end of the sleeve, as indicated at 76. An indexing pin 56 on spool 55 passes through a selected one of a plurality of openings 53a in end plate 53 in order to rotate the drum with the spool. One opening 53a is provided for each font of characters on the matrix so that pin 56 orients the drum to the same starting position with respect to the spool for each font of characters on the drum.

Tube 58 is rigidly connected at one end to frame bar 59 and is supported at the other end by conical pin 71 which is preferably of this shape in order to more accurately align tube 58. Pin 71 is mounted upon swinging gate 72 which is pivotally mounted at 75 to base plate 78 and is held in position to engage the end of tube 58 by latch member 74. A knob 73 may be provided for releasing gate 72 from the latch. When this gate is swung aside, matrix drum 15 may be removed endwise from axle 58 and replaced by another one carrying one or more different fonts of characters.

*The optical system*

The optical system is shown in Figs. 2, 3 and 21. It constitutes means for transferring a selected character from matrix 15 onto the sheet represented by film 70. Within housing 16 is a suitable light source 65. The light from this source passes through condensing lens 66 to direct a concentrated beam of light into the open hollow end of tube 58. At a suitable location intermediate its ends tube 58 has stationary mirror 52 positioned at an angle of 45° with respect to the tube axis so that the beam of light entering the tube is reflected off the mirror radially outward through the cylindrical wall of drum 15. An opening 58a is made in the wall of the tube opposite mirror 52 in order to allow the light beam to follow this path. The reflected beam of light follows a fixed or predetermined path as it passes through the wall of the drum and then through an opening 77 where it enters tube 60. The beam then passes through lens 59, which sharply focuses the image of the character on drum 15 upon the surface of film 70, as illustrated in Fig. 3. Shutter 49 is placed in the path of the beam. It may be of any suitable type, such as the conventional iris diaphragm shutter. Because the character on drum 15 is transparent to light, the image produced on film 70 when developed is a black image of the character; but it will be realized that if a white or transparent image of the character is desired on film 70, then opaque letters on a transparent background may be placed upon matrix 15.

A matrix with opaque letters is termed a "positive" and produces a "negative" image on film 70. It is desirable to use in conjunction with a positive matrix, additional means for limiting or varying the area on film 70 exposed to light. For this purpose a light gate in the form of slide 79 is provided. It has a series of apertures 79a of different sizes, smaller than opening 77, that can be registered individually with opening 77. If it is desired to move the gate to change the size of aperture 79a in accord with the width of the character on the matrix being projected, a variable actuator, such as at 42 and 43, may be connected to the gate to move it.

It is contemplated that the characters on drum 15 are arranged in a regular rectangular grid pattern in which the characters are in intersecting straight rows that extend axially and also circumferentially of the drum. Accordingly, any selected character can be accurately positioned in the path of the light beam leaving mirror 52 by a combination of axial and rotational motion of drum 15. These two components of motion parallel the rows of the grid pattern of characters. Axial motion is imparted to the matrix by bell crank 51 which is pivotally mounted at 51a to base plate 78. One end of bell crank 51 is, as shown in Fig. 22, formed with two parallel arms connected together by bolt 50. At the outer ends of the two arms of bell crank 51, are two rollers 80 which engage spool 55 in order to slide the spool axially along sleeve 75 as the bell crank swings about its pivot 51a.

In order to obtain rotational or angular movement of drum 15, flexible band 83 is wrapped around and connected to sleeve 75 at one end, the free end of band 83 being connected to one end of lever 84 which is pivotally connected at 85 to base plate 78. A tension pull on flexible band 83 rotates sleeve 75 and with it matrix drum 15 in one direction; while rotational movement in the opposite direction is obtained by the pull of tension spring 86 fastened at one end to sleeve 75.

Assume that the matrix can be indexed by movement to any one of eight selected positions arrived at from a neutral or starting position which is a ninth position. Then matrix drum 15 may be positioned in any one of nine positions (including the starting position) arrived at by axial movement alone and any one of nine other positions (including the starting position) arrived at by rotational movement alone. The combination of these two movements gives a total of eighty-one possible positions for the matrix. Accordingly, the font of characters on the circumference of drum 15 are preferably arranged in a square pattern containing eighty-one characters arranged nine in each row along the sides of the square, although other patterns are possible using my invention.

*Variable actuators*

The means for moving and positioning the matrix is primarily a pair of variable actuators 42 and 43. Variable actuator 42 is connected to one arm of bell crank 51 by coupling 88, while coupling 89 connects actuator 43 to one end of lever 84. Both of these variable actuators are alike and accordingly only one of them will be described in detail. Typical variable actuator 42 is illustrated in Figs. 26 and 27. It comprises four solenoids 171, 172, 173, and 174 mounted on a base 175. Solenoids 171 and 172 constitute one operating group and are axially aligned with each other and solenoids 173 and 174 constitute a second operating group and are axially aligned with each other. The two groups, each of one pair of axially aligned solenoids, are arranged side-by-side with their axes parallel. Each solenoid has an internal core or plunger 177 which, when the solenoid is energized, moves forwardly or upwardly as viewed in Fig. 26. The lower or rear end of each plunger 177 is threaded to receive a pair of lock nuts 178 which upon forward movement of the plunger engage a fixed shoulder 179 on the solenoid body to limit the travel of the plunger to a predetermined amount when the solenoid is energized.

The spacing between lock nuts 178 and shoulders 179 is shown in Fig. 26 for each of the four solenoids and it will be seen that each spacing is different so that the travel of the plungers in response to energization of the solenoids is different for each one of the four solenoids. As indicated in Fig. 26, the amount of travel for each plunger is preferably two units, four units, six units, and twelve units, for solenoids 171, 172, 173 and 174 respectively. The reasons for this arbitrary choice of distances will be evident later. An operating rod extends axially through the two plungers of the two solenoids of each group and is slidable within the plungers. Rod 180 passes through plungers of solenoids 171 and 172 and rod 181 through plungers of solenoids 173 and 174. Forward travel of each rod 180, 181, upward as viewed in Fig. 26, is limited by stop nuts 182 which are screwed on to the outer end of the rod to adjustably limit its travel to the left by engagement with the bodies of the right hand solenoids. At a position to be engaged by the inner end of each plunger 177 is a collar 183 which is pinned or otherwise suitably attached to each rod. Forward movement of the plungers upon energization of the solenoids is transmitted to rods 180, 181, through engagement with these collars 183.

Also attached to each operating rod is another collar 185 at a position between the two solenoids. The two collars 185 each engage one of the arms of yoke or crosshead 186 which is pivotally mounted by pivot block 184 at its mid-point to the main operating rod 187. Rod 187 lies parallel to and midway between the two rods 180 and 181. Main operating rod is mounted for linear sliding movements in brackets 188 mounted on base 175 and is normally drawn, when at rest, to the extreme left end of its range of movement, as viewed in Fig. 26, by the pull exerted by spring 189 which is attached to the rod and to bracket 188.

The variable actuator is a device for obtaining different amounts of linear movement away from a base or starting position, the different amounts of movement being the summation of various units of linear motion. Here the ultimate motions produced by the variable actuator differ from each other by equal increments, though this is not necessarily so. Also each final movement is arrived at instantaneously or substantially so, and not by the addition or accumulation of successive increments of motion of a given member. How this is done will be better understood from a brief description of the operation of the variable actuator wherein it will be seen that the variable actuator has two separable functions. It not only is an actuator or prime mover, but serves as an indexing device by virtue of its ability to produce movement of variable magnitude.

It will be noticed that all of the four plungers in the variable actuator move forward in the same direction upon energization of the solenoids and that the solenoids at the forward ends of rods 180 and 181, with reference to the direction of travel of the plungers, are capable of moving their plungers greater distances than the other two solenoids at the rear end of rods 180 and 181. If solenoid 171 alone is energized, plunger 177 advances until the lock nuts on its rear end strike shoulder 179. The total amount of this movement is arbitrarily designated as two units and is communicated through collar 183 at the forward end of the plunger to shaft 180. This motion in turn is communicated through a collar 185 to one arm of yoke 186. The resultant movement of the yoke is an angular one about the point of its connection to the stationary rod 181 so that the net movement imparted to the main operating rod 187 is one-half of the movement of plunger 177 in solenoid 171, or one unit of movement.

Assume that the two rear solenoids 171 and 173 only are energized. Then the near rod 180 and one end of yoke 186 move forward two units as before. Rod 181 and the other end of the yoke move forward six units, as indicated in Fig. 28, moving the yoke from the position 186*a* to the position 186*b*. The center point of the yoke has then traveled four units, which is the movement imparted to the main operating rod 187. Assume now a third situation in which both solenoids 172 and 173 are energized. The rod 180 and one end of yoke 186 move forward six units, as in the last example, while the other rod 181 and the other end of the yoke move forward four units, which is the range of movement of the plunger associated with solenoid 172. The yoke has now reached the position 186*c* in Fig. 28 in which the pivot at the center point has traveled forward five units. From these examples it will be seen that the net motion of the center point of yoke 186, which is the distance traveled by main operating rod 187, is equal to one half the sum of the units of movement imparted to the two ends of the yoke by the rods 180. With the combination shown, the several possible totals of the movements of the four plungers add up to sixteen units by steps of two. Consequently, it is possible to move the main operating rod by any integral number of units from one to eight inclusive. It will be apparent that, by following the principles herein explained, actuators can be built providing for a greater or smaller number of units of movement. Also the magnitude of travel of rod 187 can be varied as desired.

In the first two examples of movements of the plungers given above, only the rear one in a group of two plungers was energized so that the plungers of the forward solenoids remain stationary and rods 180 and 181 slide with respect to these plungers. However, a somewhat different situation exists in the third example in which a forward solenoid of a group is energized. Here the movement of rod 180 produced by the forward plunger is greater than the range of movement of the rear plunger since the rod can continue to advance independently of the rear plunger. For this reason, the total travel of rod 180 is the same whether or not the rear plunger is energized and the movement of the forward plunger is controlling or overriding on the movement induced by the rear solenoid. If the rear solenoid is not energized, then rod 180 merely slides within the plunger. If both solenoids of a tandem pair are energized, then rod 180 is given a greater initial thrust but the ultimate extent of its movement is controlled solely by the range of movement of the forward plunger.

In order to index matrix 15 in the various positions for projecting images of the characters, as described above, two of these variable actuators are in use, as indicated at 42 and 43, in Fig. 21. The main operating shaft 187 of actuator 42 is connected to bell crank 52 by means of coupling 88 while the main operating shaft 187 of the other actuator 43 is connected to lever 84 by coupling 89. Each actuator produces one component of the movement of the matrix, and both may operate simultaneously, rather than in sequence, to save time.

*Film carriage and magazine*

As previously described, the images of selected characters on the matrix are successively projected onto the light-sensitive surface of film 70 which is the sheet material upon which the characters are arranged in rows, and the rows in a column. This film is originally wound on spool 201 and, as it is exposed, is rolled up onto take up spool 202; and in between the two spools the film passes over pressure plate 203, as may be seen in Fig. 3. As shown in Fig. 24, the two film spools are mounted rotatively within film cartridge 23; and pressure plate 203 is located opposite window 204 through which the character image reaches the film. Film cartridge 23 may be of any conventional design to produce a light-tight enclosure for the film; and window 204 is automatically closed when the cartridge is removed, as is common practice. Any suitable type of drive mechanism may be employed to advance the film from one spool to the other, the mechanism here shown diagrammatically including a driven sprocket 206 which is mounted to drive friction belt 208 passing over pulleys on each of the two film spools and also drive film sprocket 209 which advances the film by engagement with perforations at one edge of the film, in a conventional manner.

Film cartridge 23 is adapted to slide lengthwise into traveling carriage 212 upon which it is held in proper position by any suitable means such as the registering indentations indicated at 23*a*. As the cartridge is slid into the carriage, driven gear 206 meshes with and slides axially along spline gear 210. Carriage 212 is provided at one side with upper and lower trolley wheels 213 which engage upper and lower rails 214 in order to mount the carriage for movement longitudinally of the carriage within magazine 61. Spline gear 210 is rotatively mounted on magazine 61 and extends from one end inwardly for a distance in excess of the travel of carriage 212 in order that spur gear 206 may be driven at any point within the range of movement of the carriage.

One end of the film magazine is provided with a swinging door 62 hinged to the magazine at 61*a*. Rotatively mounted upon and externally of door 62 is gear 216.

When the door is closed, as in Fig. 23, the shaft carrying gear 216 is adapted to drivingly engage the end of spline gear 210 to drive the latter as gear 216 is rotated, the connection being of such a character as to permit door 62 to be swung open for replacement of the film cartridge.

Gear 216 is driven by meshing gear 217 mounted on shaft 218 which is supported by a bracket 219. Also mounted on shaft 218 is drum 220. One end of flexible band 221 is attached to the drum, the band passing part way around the drum and then away from it on the under side to a connection through coupling 222 with the main operating rod 187 of variable actuator 40. Variable actuator 40 is constructed as described above and rod 187 thereof is adapted to linear movement. Each operation of this rod causes a rotation of drum 220 and shaft 218, which is communicated through the train of gears just described to move film 70 the distance between successive lines of composition.

Reverse rotation of shaft 218 is prevented by ratchet wheel 224 mounted on the shaft and stationary pawl 225 mounted on bracket 219. Engagement of the pawl with the ratchet limits the movement of shaft 218 to rotation in a forward direction.

Movement of film 70 for arranging successive lines of composition into a column is accomplished by movement of the film alone, without movement of carriage 212. It is also necessary to move the carriage lengthwise in order to move the film to arrange the images of successive characters into a line of composition. To produce this movement of the carriage, the carriage has on its front side longitudinally extending rack 226 which meshes with drive pinion 227. Pinion 227 is on one end of horizontally extending shaft 228 which is journaled in bearing block 230 mounted on the front side of film magazine 61. For reasons which will be developed later, bearing block 230 is slidably mounted in slide 236 on the front of the magazine for limited horizontal movement relative to the magazine and parallel to the movement of the film carriage.

On the other end of shaft 228 is bevel gear 231 which measures with and is driven by bevel gear 232. Gear 232 is mounted upon sleeve 233 which has a spline connection with shaft 234, thus allowing the sleeve to move along the drive shaft while still connected to bevel gear 232 for the purpose of accommodating the horizontal movement of bearing block 230.

Large ratchet wheel 240 is mounted on shaft 234 journaled in bracket 241. Also mounted to rotate about shaft 234 is A-shaped crank 242. At its outer end crank 242 carries a plurality of pawls 243 which engage teeth around the periphery of ratchet wheel 240. A plurality of pawls 243 are used in order to subdivide the spaces between successive teeth on the ratchet wheel and thereby obtain smaller increments of movement of the wheel. There are only two pawls here shown, their positioning being such that movement of crank 242 equal to one-half the spacing of the teeth on the ratchet wheel causes one of the two pawls to engage a tooth to advance the ratchet; but it will be understood that a larger number of pawls may be used in order to further subdivide the spacing between successive teeth.

Crank 242 is moved pivotally around shaft 234 by offset arm 245 which is rigidly attached to the crank. One end of movable link 246 is connected to the offset arm at one of several points of connection possible along an arcuate path indicated at 247 in Fig. 24. Connection between the offset arm and the swinging link is made by snap-pin 249 or the like which permits quick adjustment of the point of connection between the offset arm and the link. In this way the distance between the shaft 234 and the point of connection to the movable link may be varied so that for a given linear movement of link 246, the resultant angular movement of the offset arm and shaft 234 can be varied as desired. The other end of swinging link 246 is pivotally connected to rigid arm 248 which is mounted upon the main operating rod 187 of variable actuator 41 for linear travel.

Coil spring 250 has one end fixed and the other end attached to shaft 234, the force exerted by the spring tending to rotate ratchet 240 counterclockwise as viewed in Fig. 24. To resist this pull of the coil spring, there is provided holding pawl 251 having a plurality of teeth arranged in a pitch which subdivides the pitch of the teeth on ratchet 240 in the same manner as pawls 243 subdivides this interval. Accordingly, for any advancement of ratchet 240, one of the teeth of pawl 251 engages the ratchet teeth and holds ratchet 240 against the reverse movement.

Pawl 251 is normally held in engagement with ratchet wheel 240 by electric magnet 252. At the end of each line of composition, magnet 252 releases pawl 251. Ratchet wheel 240 is then free to rotate counterclockwise under the influence of coil spring 250 to return to the starting position which it occupies at the beginning of each new line of composition. This reverse rotation of ratchet 240 moves film carriage 212 downwardly in Fig. 23 until it engages a margin stop so that each line of composition on film 70 is started from the same point to produce an even left hand margin. An adjustable margin stop is indicated at 255 and it is connected to pivoted control handle 256 which projects above the top of cabinet to a position where it may be easily reached by the operator, as may be seen in Figs. 1 and 24. Stop 255 preferably has a spring arm or the like so that it can be manually deflected to a position out of the path of film cartridge 23 as the cartridge is inserted or removed from the film carriage.

The operator can also manually adjust the mechanism just described to vary the amount of longitudinal travel of the film carriage according to the size of type being used in the composition. This is accomplished by means of disk 258 which is pivotally mounted at 259 and is also pivotally connected to rod 260. The other end of rod 260 is pivotally connected to swinging link 246 so that as disk 258 is rotated, link 246 swings about its connection to rigid arm 248 to change the location of its connection to offset arm 245. The spring pin 249 connecting the link to the offset arm permits one end of link 246 to swing up and down and to be connected to arm 245 at any one of the several predetermined points along track 247.

*Justification*

Justification in type setting refers to the addition of a small increment to the spaces between successive words in a line of composition in order to expand the overall length of the line to a preestablished length. As the line of composition is set up, each word space is also tentatively set up between the words, the initial length of this space being a so-called normal space. The operator ends the line of composition at some point short of the right hand margin, the unused portion of the line being called the "remainder." The object of justification is to distribute this remainder equally among all spaces between words in order that all lines are of the same length to give an even right hand margin to the composition. Accordingly, the increment to be added to each word space is mathematically equal to the length of the remainder divided by the number of word spaces actually appearing in the line of composition.

As a matter of practical procedure, a maximum remainder is herein arbitrarily established as equal to four ems; and the operator ends a full line of composition somewhere within this maximum allowance. For our purposes it is also necessary to work with a maximum number of word spaces in a line; and the present mechanism is based upon the assumption that the maximum number of spaces is twenty, although it will be apparent that the mechanism can be adapted to a larger or smaller number of word spaces. From this discussion it is obvious that a complete line of composition must be set up and stored in memory unit 14 before the unused length of the remainder and the number of the word spaces can be determined. When the line is completed, both of these variable factors can be determined and it is the purpose of justifier 55 to automatically furnish the increment to be added to each normal word space in order to justify the line and to distribute the remainder accordingly.

After the justifier has established the increment for each word space, this increment is transmitted through rod 262 to the mechanism for producing linear movement of film carriage 212, as shown in Fig. 23. Pull rod 262 is connected to offset arm 263 which is rigidly attached to crank 264. Crank 264 is provided with a plurality of pawls 265 which engage the teeth around the periphery of ratchet 266, the pawls subdividing the distance between successive ratchet teeth. Detent pawl 270 is provided with a plurality of teeth so that at least one tooth on the detent comes into engagement with the ratchet teeth for any increment of clockwise rotation of the ratchet to hold the ratchet against reverse rotation. Detent 270 is normally held in engagement with the ratchet teeth by solenoid 271 but at the proper time, the solenoid is released so that spring 272 can disengage the detent from the ratchet, allowing the ratchet to rotate counterclockwise to return to a starting position.

Increments in word spacing desired for justification are, as will be described later, translated into linear movements of pull rod 262 which in turn produce clockwise rotational movement of ratchet 266. The ratchet is attached to gear 273 which meshes with rack 275 attached at one end to bearing block 230. Clockwise motion of gear 273 produces a corresponding linear motion of rack 275 (in an upward direction in Fig. 23). Since bearing block 230 journals shaft 228 carrying the pinion that engages rack 226 on the film carriage, it will be seen that this linear movement of rack 275 produces an equal and corresponding linear motion of pinion 227 and engaging rack 226 on the film carriage. This motion is in addition to any motion of the film carriage produced by rotation of gear 227 and shaft 228. This relative movement of bearing block 230 is permitted by the telescoping connection of sleeve 233 and shaft 234. Return of the bearing block and attached rack 275 to the original starting position is effected through tension spring 278.

*Line-length gauge*

One of the steps necessary in order to accomplish justification of the lines, is to have a current indication of the length of each line of composition in order that the operator is continuously advised as to the amount of the line being typed that remains unused. This function, as well as others, are accomplished by the line length gauge indicated generally at 54 and illustrated in detail in Figs. 16 to 20 inclusive.

The frame structure for line gauge 54 includes a pair of spaced plates 295 and 296 which have lateral plane portions bent to a U-shape to interconnect the two plates. These two plates form a structural frame which supports the bearings for shaft 297, as well as the other shafts in the gauge. On the upper end of shaft 297 is rotatably mounted arm 298. On the outer end of this arm is knob 301 on pin 302 which is slidably mounted in arm 298. On the other end of pin 302 is pinion gear 303 which meshes with the large gear 305 which is non-rotatively mounted on shaft 297 below arm 298. Stop pin 304 is mounted on the upper surface of plate 295 in a position to engage extension 303*a* of pinion 303. By lifting upwardly on knob 301, pinion 303 can be disengaged from gear 305 and extension 303*a* also then clears stop pin 304.

Large gear 305 also meshes with pinion 308 which is non-rotatively mounted upon screw 309 which rotates in stationary nut 307 mounted on upper plate 295. Rotation of screw 309 with respect to nut 307 causes the screw to move longitudinally and for this reason pinion 308 is made sufficiently long axially that it engages gear 305 throughout its entire range of axial travel.

A second gear 318 is mounted on screw 309 to be rotated therewith and meshes with drive gear 317 on the upper end of shaft 315. Intermittent rotary motion is imparted to shaft 315 from operating rod 310 which is adapted to intermittent linear movement. One end of rod 310 is attached to U-shaped strap 311 which, as shown in Fig. 20, is pivotally mounted on shaft 315. Strap 311 carries spring arm 312 that engages the teeth around ratchet wheel 314 which is non-rotatably mounted on the lower end of shaft 315. As viewed in Fig. 18, motion of rod 310 to the left causes ratchet 314 to revolve counterclockwise; and reverse rotation of the ratchet is prevented by spring detent 316 which is a curved leaf spring mounted on bracket 329.

Mounted on shaft 309 to rotate therewith, is contact arm 319. As screw 309 revolves, it moves upwardly in nut 307 bringing contact arm 319 into engagement with the under side of pulley 320 which is loosely mounted to rotate about nut 307 in a hub 328 of electrically non-conducting material. One end of cord 321 is attached to pulley 320 and part of the cord is wrapped around the periphery of pulley 320, the other end being attached to the justifier 55 for reasons which will be explained.

As the composition is typed, the operation of the several character keys 111 on the typewriter causes rod 310 to be reciprocated by variable actuator 44, the construction of which is the same as the variable actuator previously described. The width of all characters is the same on a typewriter but of course the width is not the same for characters in set type. Consequently, some variation is required in the amount of movement given to rod 310 according to the width or space in the line required for each character and this is accomplished by a variable actuator, the main operating rod 187 of which is connected to rod 310 by coupling 323, as seen in Fig. 18. Reciprocation of rod 310 causes rotation of ratchet wheel 314 and through gears 317 and 318 causes screw 309 to revolve. The ratio of the gears is such that when the total of the movements of rod 310 represents a length of composition equal to four ems, screw 309 has been given one complete revolution. Accordingly, as the screw starts to revolve at the beginning of a line of composition contact arm 319 makes one revolution for each four ems of type set and it is designed to come into contact with projection 320*a* on the under side of loose pulley 320 at the beginning of the remainder distance which is the last four ems in a line.

As the beginning of this remainder is reached, a warning is flashed to the operator by signal light 325. This is accomplished by completing an electric circuit which includes conductor 427 connected to brush 336 that contacts screw shaft 309. Contact arm 319 is electrically connected to the shaft. When it engages projection 320*a* on loose pulley 320, the electrical circuit is completed. The rest of the circuit includes pulley 320 which is electrically conductive and is engaged by a second brush 337 mounted on an insulated frame plate 295. From brush 337 a conductor 335 goes to a light 325, the other wire from the signal light going back to the circuit through a common ground.

As screw 309 turns, it revolves large gear 305 and shaft 297. Rotation of this shaft puts increased tension in coil spring 330, the outer end which is held stationary while the inner end is attached to sleeve 331 pinned to shaft 297 to rotate therewith. The energy stored in spring 330 is used to return the parts to the starting position at the beginning of each line of composition. This is accomplished manually by pressing down on knob 332 on shaft 333 to depress the shaft which carries a tapered cam portion 333*a* that engages extension 334 on detent 316. Downward movement of the shaft causes detent 316 to move to the left, as viewed in Fig. 17 or 18, disengaging the detent from ratchet 314 which frees the parts to move in a reverse direction under the influence of coil spring 330. This causes threaded shaft 309 to revolve in the direction that lowers contact arm 319 to a position such as that shown in Fig. 17, at which the line of composition begins.

Return movement of the parts under influence of coil spring 330 is stopped by engagement of adjustable stop 303*a* with fixed pin 304. Since the position of 303*a* is adjustable about the periphery of gear 305, the end of this reverse movement, or in other words, the beginning of the new line of composition, is determined by adjusting the position of movable stop 303*a* around gear 305. The operator is informed of the proper position for the beginning of each line by dial 306 which is calibrated to show the lengths of various lines of composition for different sizes of type, as may be seen in Fig. 16.

Line gauge 54 enables the operator to set the mechanism for a line of desired length of composition, based on the size of type being set. As the line is typed, the line gauge shows that portion of the line which has been used and also that portion of the line which remains to be used. The gauge is also adapted to actuate a warning signal when the remainder portion of the line has been reached, notifying the operator that a decision must be made, within a known distance, about where to end the line. As will now be explained, the line gauge mechanism also serves the additional function of setting into operation the justifier by pulling on cord 321 which connects the two mechanisms mechanically.

There has also been incorporated in the line gauge, multiple-contact switch 326 which may be of any conventional design. The several contacts of the switch are electrically connected to various ones or combinations of the solenoids 171, 172, 173, and 174 within variable actuator 40. Setting switch 326 selects the solenoids of actuator 40 that are energized and thereby regulates the amount of movement produced by the actuator for its pull rod 187. This movement, as described above, produces the rotation of film spools 201 and 202 that spaces the successive lines of composition in columnar form on film 70. The switch may be placed elsewhere, but this is a convenient location in order to place allied controls close together.

*The justifier*

Justifier 55 is shown in detail in Figs. 13, 14, and 15. The purpose of this mechanism is to keep a record of the unused part of the remainder portion of each line of compositon and of the number of word spaces in the line. From this information the justifier establishes the increment to be added to each space between words in order to bring the line to a predetermined length, as explained above. If this justification increment is designated as J then $$J=\frac{R}{N}$$

when R represents the unused portion of the remainder and N is the number of word spaces in a line. In the justifier herein disclosed, the number of word spaces has arbitrarily been limited to twenty. Accordingly, there are twenty individual cams 351 in each of the four sets of cams 351—1, 351—2, 351—3, and 351—4, each individual cam representing mechanically the space R to be distributed among a given number of word spaces.

In general, the length of a line occupied by a given number of characters varies from one line to the next, since not all characters occupy the same space in a line. For example, the letter "*i*" occupies considerably less space than the letter "m." Accordingly, it is necessary to have at least one line of composition typed and stored in the memory unit before the operation of justifying the line can be started. In order not to hold up typing composition for the next line while the preceding line is being projected onto film 70, the justifier is adapted to establish the justification for each of four separate lines by using four similar units which are used in sequence. It will become apparent from the description below that the number of complete units is conveniently established at four but a larger or smaller number of justifying units may be built into the justifier. Since all four units are alike, the operation and structure of the single unit will be described with the understanding that other units are the same.

In Fig. 13 there is indicated at 351—1 a stack of twenty spiral cams 351 mounted upon shaft 361 to rotate therewith. A typical cam and the manner of designing its spiral outline are shown in Fig. 15. The active portion of the cam is limited to approximately three-fourths of a circle or a little less. At any point along this active portion, the rise of the cam represents a value of J as defined above. At the beginning of the active portion of the cam, which is located at the top center of Fig. 15, the value of J is at a maximum, since at this point the value of R is a maximum and is there represented as the total amount of four ems to be distributed at the beginning of the remainder portion. Mechanically, both R and J are represented by a radial distance from the active spiral surface to a circle of a radius equal to the maximum radius of the spiral. Progress through the remainder portion is represented by proportional angular movement of the cam, so that by proceeding angularly around the spiral surface of the cam, points are successively reached at which the value of R is reduced from a maximum of four ems to three ems, then two ems, and so on, and finally to zero.

The total number of spaces between words in a line is taken into account by supplying one cam for each of the assumed number of word spaces. Thus the bottom cam in the stack 351—1 has a spiral surface that represents the values of J for a single word space or when $N=1$. Since $N=1$, R and J are equal and both are represented by the rise of this cam which is radial distance between a given point on the cam surface and the maximum radius. The rise of the cam immediately above it represents the values of J computed for two word spaces or $N=2$ and the radial distances for J are only one-half as great on this cam at any point along it as at the same point for the bottom cam. This is because the same total remainder space R is being divided between two word spaces and therefore each word space receives only one-half as large an increment J. The next cam up is for three word spaces and has a flatter spiral than the cams below since the radial distances for J are only one-third as great as for the bottom cam. Progressing upwardly in stack 351—1 each cam represents one more word space per line until at the top of the stack the topmost cam 351 represents values of J for twenty word spaces in the line. All of the cams are in a single stack representing the twenty different sets of values of J for values of N from one to twenty. All the cams are non-rotatively attached to shaft 361 and are given a common orientation so that the zero value on all cams lies along a line parallel to the axis of shaft 361 and spaced from it by a distance equal to the maximum radius of the cams.

Attached to the upper end of each shaft 361 is a linear ratchet 350 having peripherally extending circular teeth. The axial spacing between these teeth is the same as the axial distance between cams 351 and likewise the number of teeth in ratchet 350 is twenty, the same as the number of cams. Ratchet 350 is pinned or otherwise securely attached to shaft 361 which is mounted for longitudinal movement in frame 380 of the justifier. On the lower end of shaft 361 gear 358 and ratchet 359 are keyed to the shaft in a manner to rotate therewith but to permit this longitudinal movement of the shaft to take place relative to the gear and ratchet. Shaft 361 with its attached ratchet 350 and stack of cams 351 constitute a single unit. There are four similar units arranged in a row in the justifier.

A single shaft 353 is slidably mounted for rotational and endwise movement in frame 380 and has mounted upon it four pawl operating arms 355. These arms 355 are located at intervals of ninety degrees around the axis of shaft 353 so that by rotating the shaft ninety degrees successive arms are brought into operative position.

As shown in Fig. 13, arm 355 at the left hand end of shaft 353 engages pawl 367 which is part of a knee-type linkage. The pawl is pivotally connected at its upper end to link 368 which is able to swing about its pivotal connection 369 to frame 380. At its lower end, the pawl slides over guide 370 and engages teeth on linear ratchet 350. When shaft 353 is reciprocated to the right, the lower right corner of the pawl is swung forward and down a distance sufficient to move shaft 361 down a distance equal to or slightly greater than the spacing between successive teeth of ratchet 350. A spring pressed detent 360 engages successive teeth on the ratchet to hold the ratchet and shaft 361 against upward return movement induced by compression spring 363 which is mounted underneath the bottom cam of stack 351—1 and above a transverse bar of frame 380.

Detent 360 is pressed aside to release the ratchet and allow it to return upward to starting position at the proper time by wiper arm 364 fixed to shaft 353 to be turned by the shaft. When released from detent 360, the shaft with its ratchet and cams is lifted by spring 369 to the starting position which is occupied at the beginning of a line of composition.

In order to read the cams representing the different values of J, a plurality of reader arms 372 are mounted upon shaft 371 which is mounted in frame 380 for rotational and axial movement. These reader arms 372 are four in number and also mounted at ninety degree intervals around shaft 371 so that the reader arms may individually and successively be brought into operating position by rotation of the shaft. The left hand arm in Fig. 13 is in operative position in which the end of the arm engages the surface of a cam 351 in the left hand stack 351—1.

Rotation of each shaft 361 and its stack of cams 351 is effected by square rack bar 356 which has on it four short racks 357, spaced ninety degrees apart around the rack bar. By rotation of the bar any one of these racks may be brought into operative position, such as is shown at the left hand end of the bar in Fig. 13, in which the rack 357 engages gear 358 keyed to shaft 361. As may be seen from Fig. 14, longitudinal movement of rack bar 356 causes shaft 361 to turn, revolving the stack of cams 351 with respect to the associated reading arm 372. Reverse rotation of shaft 361 is prevented by spring detent 365 engaging the teeth on ratchet 359 fixed on the shaft.

Solenoid 354 is provided which, in operation, is responsive to operation of space bar 29 on the typewriter. Each time the space bar is depressed, solenoid 354 is energized and, through suitable linkage including bell crank 366, this solenoid exerts a pull to the right on shaft 353. This movement of the shaft brings one of arms 355 into engagement with its associated pawl 367 to move the shaft 361 downwardly from one tooth to the next of linear ratchet 350. This shifts the stack 351—1 of cams to change the cam which will be engaged and read by the associated arm 372 as each word space is set up in the composition being typed.

When the start of the remainder area of the line is reached, arm 319 on the line gauge contacts extension 320*a* and starts to turn pulley 320. As the typewriter operation is continued, cord 321 is wound on pulley 320 in the line gauge mechanism. This cord 321 is connected to rack bar 356 and the pull of the cord moves the rack bar longitudinally to the right in Fig. 13. This longitudinal movement of the rack bar, by reason of the engagement of one of its racks 357 with a gear 358, is converted into rotational movement of a stack of cams 351. In this way, as the composition being typed enters and proceeds through the remainder area, the cams 351 are rotated with respect to the reader arm 372 so that the value of J to be read by the arm is continually decreasing at the same rate that the unused remainder portion of the line is decreasing.

By the combined rotational and axial movements of cams 351 the value of J for any given number of word spaces in a line of composition up to twenty word spaces, is selected and retained in the justifier. It is ready for use when required and is actually taken out of the justifier by operation of solenoid 373 which is adapted to move shaft 371 endwise. Shaft 371 is connected to operating rod 374 which is shown in Fig. 23 also as a link connected to the mechanism for introducing the justification into the travel of film carriage 212.

Solenoid 373 is responsive to signals from pins in memory unit 14 indicating spaces between successive words; and at each word space the solenoid exerts a pull on rod 371 which brings reader arm 372 into contact with the active surface of a cam 351, thus moving the reader arm and shaft 371 through a distance which represents a value of J to be added to a specific word space. This small increment of distance is transmitted directly by rod 374 to the mechanism described in connection with the film carriage which imparts a movement of the proper magnitude to the film carriage.

In the justifier, shafts 353 and 356, are interconnected through a gear train, indicated generally at 377, to shaft 378. Shaft 378 is drivingly connected to four-place stepper 362, which is of conventional design and upon each period of energization rotates shaft 378 through 90°. This rotation of the shaft is transmitted by gear train 377 to both shafts 353 and 356 which are simultaneously turned through 90°. Hence energization of stepper 362 at the end of each line of composition as it is typed causes shafts 353 and 356 to turn a quarter turn and bring another arm 355 and rack 357 into operative position. This causes the next set of cams 351 to become operational in selecting a value of J for the new line of composition. In this way the four sets of cams are used in sequence repeatedly.

Shaft 371 with the reader arms on it is also rotated a quarter-turn at a time by four-place stepper 379, of any conventional design connected to the shaft through a linkage indicated generally at 381. Stepper 379 is energized in response to a line-end signal from the memory unit which of course arrives at some time after the line has been typed. The operation of stepper 379 and shaft 371 is independent of stepper 362 and shafts 353 and 356. After each line of composition is taken off the memory disk and projected into the film, stepper 379 is energized to bring another reader arm 372 into operative position. It then proceeds to read the values of J established for a completed line previously typed while a subsequent line is being typed.

*Schematic assembly and wiring diagram*

There is shown in Fig. 29 a schematic assembly of the various units of my phototype setting machine and a wiring diagram of the electrical connections between the various units. Power may be brought into the unit through a pair of conductors 400 from any suitable source, ordinarily a commercial 110 volt line. Lamp 65 furnishing the light for projecting images on the photographic film may be connected directly to this source through wires 400. Since it is preferable to operate other elements of the device at a lower voltage in order to use smaller wires with lighter insulation and to obtain other obvious advantages, it is preferable that conductors 400 be connected to step-down transformer 401. From the secondary of this transformer a pair of conductors 402 lead to junction block 403, these conductors carrying the lower voltage of any desired value.

From junction block 403, conductor 405 takes power to a number of elements, a branch 406 being connected to all of the reading switches 144 of memory unit 14.

Conductor 405 continues on to a connection with junction block 407 and also with erase key 28. From junction block 407, a branch conductor 405*a* connects to code switch bank 12 within which it is connected to all of pins 152 through one of leaf springs 154 or other similar common connection. From switch bank 12, a conductor from each of binding posts 163 and 158 lead to junction block 407. Likewise, in actual practice an equal number of conductors leave the junction block going to memory unit 14 since each of the twelve code bars 153 is connected electrically to one of the twelve solenoids 149. Instead of showing all conductors in Fig. 28, typical ones are shown. For example, only three conductors 408, 409 and 410 are shown as connecting the switch bank to the junction block and the junction block in turn to the memory unit. Conductor 408 represents a group of eight conductors from binding post 163 transmitting impulses controlling character selection; and 409 and 410 each represent two or more of the four conductors from binding posts 158 which transmit impulses forming code signals for two typical functions other than selection of characters, as will be explained more fully.

Erase key 28 is a normally open switch connected to conductor 405 and also connected by conductor 412 in series with solenoids 150 of the memory unit, the circuit through the solenoids being completed by connecting one terminal of the solenoids to a common ground. Various units herein are shown as having a ground connection; but it will be realized that this is a diagrammatic representation in whole or in part of a return line and that actually parallel conductors may be substituted for the ground connection at the several units. Such conductors return to junction block 403, as for example conductor 430, to complete the circuit to the secondary of transformer 401.

As mentioned previously, conductor 406 is connected to one terminal of each of microswitches 144 which are normally open switches. The other terminals of these switches are connected by conductors 418, 419 or 420, passing through junction block 417, to junction block 403. In actual practice there are twelve conductors going between the junction blocks, one from each of twelve microswitches; but only three conductors are shown here, corresponding to the conductors 408, 409 and 410 respectively, since these can typically illustrate the connections and the functions of all the conductors from switches 144.

After leaving junction block 403, the conductors illustrated by conductor 418 are connected to either actuator 42 or 43 to produce one of the two components of movement of matrix 15. The conductor 418 and those like it carry the code impulses which select or determine the character to be printed on the film. Likewise upon leaving junction block 403, conductors illustrated by conductor 419 are connected to line length gauge actuator 44 and also to the line length gauge 54 itself. The conductors 419 are those which carry impulses from the memory unit which select the width to be accorded a character or word space. Accordingly, the value of each of these individual widths is communicated to actuator 41 which controls the lengthwise movement of the film carriage within magazine 61 to move the film for recording successive characters in a line.

In addition to the ordinary keys 111 for printing characters on the typewriter, the typewriter is provided with certain other special keys such as insert key 27, erase key 28, space bar 29, justifying key 30 and new line key 110. The connections to erase key 28 have just been described. Space bar 29 is connected in the same manner as a character key and its operation sets up code impulses in conductor 408. The function performed by each of the other keys may be grouped under the general heading of special functions and all considered in the same manner. For example, new line key 110 is typical and it has already been explained how when this key is depressed, switches are operated in code bank 12 to send out coded signals which go to memory unit 14 via conductors 410 to be stored in the unit. As any one of these stored special function signals is read by the appropriate microswitches 144, the corresponding code impulses are transmitted by conductor 420 to junction block 403. A special function code signal, in the case of a signal at the end of each line of typed composition, then passes from the memory disk over conductors 420 through switch 326 to actuator 40 which causes the film to be advanced from spool 201 to spool 202 a sufficient distance to receive a new line of composition on the film. Also connected to conductor 420 is a branch 421 which is connected to four place stepper 379 to receive each impulse from the memory unit denoting the end of a line of stored composition. Likewise another branch conductor 422 is connected to conductor 420 and to magnet 252 and to magnet 271. Both magnets 252 and 271 are thereby actuated in response to a line end signal received from the memory unit.

Solenoid 373 is connected in parallel with actuator 41 by conductor 424 connected to conductor 419. Thus solenoid 373 is energized by each code signal indicating a word space in the composition as it is read by the memory unit.

Certain information is not only to be stored in the memory unit 14 but is also to be communicated directly to operating elements. Thus conductors 426 and 427 are connected at the memory unit to the conductor 409 carrying the code impulses indicating the width of characters and word spaces in the typed composition. Conductor 426 is connected to carry only signals indicating a word space and goes to junction block 403 and through the junction block to solenoid 354 so that solenoid 354 is energized each time that space bar 29 is depressed. Conductor 427 is connected to carry all signals indicating width of a character or of a word space and passes through junction block 403 to actuator 44 and also to the line length gauge itself. Actuator 44 is thus energized to keep in the line length gauge a running total of the length of the line as it is typed. Likewise conductor 428 is connected at the memory unit to conductor 410 which is one of the special function conductors, in this case the one carrying the line and signals. Conductor 428 goes from the memory unit to junction block 403 from which it goes to stepper switch 362. Conductor 430 is connected between memory unit 14 and junction block 403 as a return lead paralleling conductor 405 and completes the circuit from solenoids 149 and 150.

*Summary of operation*

When a character key 111 on the typewriter is depressed, a first series of code signals, composed of two different sets of code signals, in the form of electrical impulses are initiated in the code switch bank 12. One of these is a combination of impulses established by selected groupings of the contacts between a movable pin 152 and one or more fixed code bars 153 using a group of eight code bars for the purpose of selecting characters to be used in the printed composition. As explained above, it is possible to obtain eighty-one different combinations of impulses using eight code bars. These electrical impulses travel from the switch bank over one or more conductors 408 to energize selected ones of solenoids 149 in memory unit 14. There being eight code bars, eight solenoids arranged in four pairs, are utilized for this purpose, one solenoid being electrically connected to each code bar. As a result of these electrical impulses, one or more of the pins 141 in disk 142 are given a code setting. A pin in each row either remains in neutral position or is displaced in one direction or the other from that neutral position.

The second set of electrical impulses initiated upon depressing a character key 111 is a combination which represents the width of the character selected. The character width selection is one of the group of secondary functions which is coded by switch bank 12 and which in turn is stored in memory unit 14 by transmitting thereto a series of code impulses. For this purpose four of the code bars are used, preferably being the four code bars within the bracket at the upper right hand side of the switch bank in Fig. 12. Using these four code bars, there are a total of nine possible code combinations of impulses and it is preferable to use four of these possible combinations to represent widths of characters typed by depressing character keys 111.

These last mentioned four code bars are connected by four conductors, segregated for purposes of description into two groups, indicated generally at 409 and 410 in Fig. 29, to four solenoids 149, arranged in two pairs in the memory unit. These two pairs of solenoids are each adapted to set a pin in one of the two remaining rows of pins 141 on the memory disk, either by leaving the pin in neutral position or by displacing it in one direction or the other from that neutral position.

As the code signals of either or both sets are stored on the memory disk, the memory disk is rotated intermittently by continued operation of typewriter 11 to advance carriage 11*a*. Eventually the pins that physically represent the code signals are moved past a group of reading arms 145. Pins displaced in either direction from the neutral position engage one of the arms 145 to close a corresponding pair of contacts in a microswitch 144 and in so doing a second series of electrical impulses, corresponding to the first series stored on the memory disk, are generated and transmitted to other parts of the mechanism. The second series of code signals likewise may be divided into the same two sets just described. Impulses of the first set used for selection of characters and received in the memory unit over eight conductors 408, are transmitted from the memory unit over eight conductors 418. After leaving junction block 403, four of these conductors 418 are connected to actuator 43 and four to actuator 42. Impulses coming over the conductors reach one or both actuators and may energize one or more of the four solenoids in actuator; and the result is a predetermined movement of each of the main operating rods 187 of the two actuators. The operating rods are connected operatively to the matrix to provide power for moving the matrix. Movement of these two operating rods is transferred, in the manner already described, to matrix 15 in order to position the selected character in the fixed path of the light beam projected on film 70. After the matrix has been properly indexed and come to rest, shutter 49 is tripped to expose the film and print on it the image of the selected character.

For every character printed on the film, a selection is also made of character width. Character width signals are transmitted from the memory unit over the conductors indicated at 419 through the junction block 403 and then over conductor 419 to actuator 41. Here one of the four possible signals, by actuating one or more of the solenoids in the actuator, converts this selection into linear movement of the main operating rod 187 of this actuator. This latter movement in turn is transmitted through apparatus shown in Fig. 24 and described in connection therewith to move the film carriage longitudinally the amount corresponding to the width of the character selected. Word spaces of normal width also energize actuator 41 for movement of the film carriage.

The width of each character uses up a certain amount of the line of composition being typed. To record the usage of this space as it occurs, the same code signals for character width are transmitted over conductor 427 to line-length gauge actuator 44 to produce a simultaneous movement of the main operating rod 187 of that actuator. Each movement of the actuator rod becomes equal linear movement of operating rod 310 of the line-length gauge and all linear movement of rod 310 are totaled in the line-length gauge in the form of rotational movement of contact arm 319 and also movement of dial 306 fastened to gear 305. When the line has been composed up to the remainder area, contact arm 319 engages loose pulley 320 to start rotation of the pulley and also to complete a circuit to signal light 325.

The ratio between gears 317 and 318 as well as the larger diameter of pulley 320 relative to gear 318 provides means for magnifying, at the periphery of pulley 320, the movement through the remainder area represented by linear motion of rod 310. This magnified movement is translated into the movement of cord or cable 321 wrapped around pulley 320 and also connected at the other end to rack bar 356 of the justifier. The pull on cord 321 as the remainder area is entered initiates longitudinal movement of rack bar 356 of the justifier mechanism so that as the terminal part of the line of composition is typed and progress is made through the remainder area, proportional rotation is given to one of the four stacks of justifying cams 351.

Operation of space bar 29 may set into operation the same two sets of electrical impulses as one of the character keys, since a space between words is in effect a blank character. In practice, it may be considered that signals of zero value reach one or both actuators 42 and 43. At the same time a character width code signal is made, which is stored in the memory unit and later transmitted to actuator 41 to move the film carriage the proper distance. This same signal when first generated is transmitted around the memory unit by conductor 427 to actuator 44.

While the space between words is the same as selecting the width of a character, information about the word space differs in that it is also communicated directly to solenoid 354 at the same time the space bar is depressed. This is accomplished through the circuit established by one of the conductors of the group 409 and conductor 426 which carries the signal beyond the memory unit. The impulse energizes solenoid 354 to move a shaft 353 in the justifying unit longitudinally. Through arm 355 and pawl 367, this motion is converted to axial motion of a shaft 361 and linear ratchet 350 equal to the distance between successive teeth of ratchet 350 on the shaft. By this means the number of spaces in the line are counted as the line is typed and the stack of cams 351 is shifted axially an equal number of cams in order that the proper cam is selected to be in a position for engagement subsequently by a reader arm 372.

The operation of erase key 28 has been explained before. It does not actuate any switches in code bank 12 but when depressed energizes two solenoids 150 and all of the twelve solenoids 149 in order to neutralize the pins and erase from the memory disk a character previously stored on it.

Insert key 27 is another special function key. It is mechanically related to one of the code switches 12 in the same way as a regular key bar 111. When depressed, a special code signal is transmitted to the memory unit over a conductor 410. This same signal is later repeated as the stored line is set up on the film. The signal sends impulses via conductor 421 to alarm 99 which may be a bell or light or both to warn the operator. Any of a number of conditions can be signalled. For example, if the operator wishes to change type fonts in the middle of a line to set some characters in capitals or italics, he can be notified of the arrival at this point in the composition. He can then change the matrix to a new font or take whatever action is required.

After a line has been typed, a signal belonging to the special function group is initiated by switch bank 12 at the end of the line by depressing justifying key 30. This signal proceeds over one of the conductors 410 and is stored in memory unit 14 but it also proceeds over conductor 428 from the memory unit through junction block 403 to stepper switch 362 which, now that the end of the line is reached, brings a new set of justifying cams into operation in the justifier. The set of cams 351 associated with the line just typed is then retained in position to be subsequently read by an arm 372 at the time that the memory disk transmits signals from that same line of composition for reproduction of the characters on film 70.

The line-end signal stored on disk 14 is later included in the second series of signals sent out from the memory disk and transmitted over one of the group of conductors 420. From junction block 403 the signal goes by conductors 420 to actuator 40 to space the film for a new line of composition. It also goes to solenoids or magnets 252 and 271 to release the mechanisms controlling the movement of the film carriage for return to their initial positions which they are to occupy at the beginning of each line of composition. The signal also goes over conductor 421 to stepper 379 which in response thereto rotates reader arm shaft 371 of the justifier to bring a new reader arm into operative position against the next one of the stack of cams 351 to be read.

Electric typewriters have a carriage return key designated here as new line key 110. When present, it is preferable to provide it with a small tab overlapping justifying key 30 so that when key 110 is depressed not only is carriage return effected but key 30 is also operated with the action just described.

From the above description it will be evident that many variations in the exact design or location or arrangement of the elements of my new type composing apparatus may be made without departing from the spirit and scope of my invention. Accordingly it is to be understood that the above description is considered to be illustrative of rather than limitative upon the appended claims.

I claim:

1. In an apparatus for composing a column of lines of type characters on a sheet material, the combination comprising: a typewriter having a moving carriage and a plurality of key bars; means associated with each individual key bar for actuation by said key bars to originate and transmit a particular combination of impulses specific to one character upon actuation of a key bar; and means for converting the impulses to physical movements of elements indicative of information and storing said information to accumulate a line of composition, said means including a single rotatable disk directly connected to the typewriter carriage for advancing rotational movement proportional to carriage movement by and in synchronism with the typewriter carriage for storing said information in successive spaced positions and a plurality of shiftable elements mounted on said disk arranged in a plurality of groups that are carried over a closed path by movement of said disk, each group of elements consisting of a plurality of said elements individually shiftable between different positions whereby any group can represent any one of a plurality of characters.

2. Apparatus as in claim 1 that also includes a movable cylindrical matrix having a font of characters thereon; and means for converting said impulses into linear and angular movements of the matrix bringing characters on the matrix in succession to a predetermined position.

3. In apparatus for composing a column of lines of type characters on a sheet material, the combination comprising: a typewriter having a moving carriage and a keyboard having a plurality of movable key bars; means associated with said key bars for actuation by movement of individual key bars to originate a different combination of impulses specific to each character; means for recording and storing said combinations of impulses comprising a rotatable disk, a plurality of groups of pins movably mounted on said rotatable disk for movement relative to the disk axially thereof, and means for transmitting individual impulses to said pins to position individual pins within a group of pins in a pattern forming a record of said impulses said last mentioned means comprising a plurality of stationary pin-setting members responsive to movement of any key bar and adapted to set a group of pins to represent any one of a plurality of characters; means drivingly connecting the disk to the carriage to rotate the disk in proportion to linear movement of the carriage as a line of composition is typed; and means disconnecting said drive means during return travel of the typewriter carriage.

4. In apparatus for composing a column of lines of type characters on a sheet material, the combination comprising: a typewriter having a moving carriage and a plurality of movable key bars; means associated with said key bars for actuation by movement of individual key bars to originate a unique combination of impulses for each key bar; means for recording and storing said combinations of impulses comprising a rotatably mounted disk operatively connected to the typewriter carriage to be rotated in synchronism therewith, a plurality of pins slidably mounted in the disk for movement axially of the disk, and means for displacing the pins individually in either direction from a neutral position by movement in said axial direction to form a record of said impulses.

5. Apparatus as in claim 4 which also includes stationary means for reading the displaced pins after a predetermined angular movement of the disk.

6. In apparatus for composing a column of lines of type characters on a light-sensitive film, the combination comprising: a typewriter having a moving carriage and a plurality of key bars; electrical switch means associated with each one of said key bars for actuation by the associated key bar to originate and transmit a series of electrical impulses corresponding only to one selected character; means for receiving said series of electrical impulses and converting them to a physical indication, and storing said indication; means for reading said physical indication and transmitting a second series of electrical impulses; a matrix having a cylindrical wall on which is a font of characters; means mounting the matrix for both axial and rotational movement; a light source projecting light beam along the axis of the matrix; mirror means within the matrix reflecting the beam of light from said source outwardly through the cylindrical wall to project an image of a character onto the light-sensitive film; means for moving the matrix axially in response to some impulses of said second series; and separate means responsive to other impulses of said second series for moving the matrix angularly about its axis simultaneously with said axial movement.

7. In apparatus for composing a column of lines of type characters on a light-sensitive film, the combination comprising: a plurality of key bars; electrical switch means associated with said key bars and adapted upon actuation by any one of said key bars to originate a unique series of electrical impulses corresponding only to a selected character, said switch means including a plurality of movable contacts arranged in a row and each movable longitudinally in response to movement of a key bar, and a plurality of code bars extending parallel to said row of movable contacts and having tabs projecting into the path of said movable contacts to be engaged by the movable contacts to complete electrical circuits; means for receiving said electrical impulses and converting them to a physical indication and storing said indications; means for reading said physical indications and originating a second series of electrical impulses; and means actuated by said second series of electrical impulses for projecting images of selected characters onto the light-sensitive film.

8. In apparatus for composing a column of lines of type characters on a light-sensitive film, the combination comprising: a plurality of key bars; electrical switch means associated with said key bars for actuation by said key bars and adapted upon actuation by any one of the key bars to originate a unique series of electrical impulses corresponding only to a selected character, said switch means including a plurality of pins arranged in a row and each movable longitudinally in response to movement of a key bar, and a plurality of code bars extending parallel to said row of pins and having tabs projecting into the path of said pins to be engaged by the pins to complete electrical circuits; means for moving the code bars parallel to the row of pins to an alternate position in which alternate tabs on the code bars project into the path of the pins to engage the pins; means for receiving said electrical impulses and converting them to a physical indication and storing said indications; means for reading said physical indications and originating a second series of electrical impulses; and means actuated by said second series of electrical impulses for projecting images of selected characters onto the light-sensitive film.

9. In apparatus for composing a column of lines of type characters on a light-sensitive film, the combination comprising: a typewriter having a moving carriage and a plurality of key bars; electrical switch means associated with said key bars for actuation by said key bars to transmit a series of electrical impulses corresponding to selected characters; a disk rotatably mounted; drive means connecting the disk to the typewriter carriage to advance the disk in synchronism with advance movement of the carriage; means disconnecting said drive means during return movement of the carriage; a plurality of pins slidably mounted on the disk for movement axially of the disk in either direction from an intermediate neutral position; solenoid means adjacent the disk at each side thereof and responsive to said impulses to more individual pins from said neutral position; means adjacent the disk and angularly spaced from the solenoids for reading the position of said pins after being positioned and for transmitting a second series of electrical impulses determined by the positions of said pins; and means actuated by said second series of electrical impulses for projecting images of selected characters onto the light-sensitive film.

10. In apparatus for composing a column of lines of type characters on a light-sensitive film, the combination comprising: a typewriter having a moving carriage and a plurality of key bars; electrical switch means associated with said key bars for actuation by said key bars to transmit a series of electrical impulses corresponding to selected characters, a disk rotatably mounted on a stationary frame; drive means connecting the disk to the typewriter carriage to advance the disk and carriage in synchronism; a plurality of pins extending through and slidably mounted in the disk to move axially of the disk, said pins being arranged in a plurality of circular rows concentric with the disk axis; a pair of solenoids for each row of pins mounted in fixed positions and arranged one solenoid on each side of the disk, to engage the pins of the associated row and to displace the pins endwise from an intermediate neutral position, the solenoids being electrically connected to the electrical switch means and responsive to said impulses; stationary means for reading the position of said pins as the disk rotates including a second switch means transmitting a second series of electrical impulses determined by the position of the displaced pins; and means actuated by said second series of electrical impulses for projecting images of selected characters onto the light-sensitive film.

11. In apparatus for composing a column of lines of type characters on a light-sensitive film, the combination comprising: a typewriter having a moving carriage and a plurality of key bars; electrical switch means associated with said key bars for actuation by said key bars to transmit a series of electrical impulses corresponding to selected characters; a disk rotatably mounted on a stationary frame; drive means connecting the disk to the typewriter carriage to advance the disk and carriage in synchronism; a plurality of pins slidably mounted in the disk to move axially of the disk, said pins being arranged in a plurality of circular rows concentric with the disk axis; a pair of solenoids for each row of pins mounted in fixed positions and arranged one solenoid on each side of the disk, to engage the pins of the associated row and to displace the pins endwise from an intermediate neutral position, the solenoids being electrically connected to the electrical switch means and responsive to said impulses; stationary means for reading the position of said pins as the disk rotates including a second switch means transmitting a second series of electrical impulses determined by the position of the displaced pins; stationary means to return each displaced pin to a neutral position after reading; erasing means to return a displaced pin to a neutral position prior to reading; and means actuated by said second series of electrical impulses for projecting images of selected characters onto the light-sensitive film.

12. In apparatus for composing a column of lines of type characters on a light-sensitive film, the combination comprising: a movably mounted matrix having a plurality of characters arranged in a straight line; and means for moving the matrix linearly to selected positions along said line, said moving means including a pair of solenoids arranged with their axes parallel, a plunger for each solenoid movable linearly along one of said axes in response to energization of the respective solenoids, and linkage connecting the plungers to the matrix, said linkage including means producing movement of the matrix which is a fraction of the sum of the movements of the two plungers.

13. In apparatus for composing a column of lines of type characters on a light-sensitive film, the combination comprising: a movably mounted matrix having a plurality of characters arranged in a straight line; and operating means for moving the matrix parallel to said straight line, said operating means including a plurality of solenoids responsive to electrical impulses and arranged in two spaced parallel groups, an operating rod drivingly connected to the matrix and located midway between the two groups of solenoids and means connecting the operating rod to both groups of solenoids to move the operating rod a distance equal to one-half the sum of the total movements produced by both groups of solenoids.

14. In apparatus for composing a column of lines of type characters on a light-sensitive film, the combination comprising: a movably mounted matrix having a plurality of characters arranged in a straight line; and operating means for moving the matrix parallel to said straight line, said operating means including a plurality of solenoids responsive to electrical impulses and arranged with at least two solenoids in each of two parallel groups of solenoids, means limiting the travel of the plunger of each solenoid upon energization to a different predetermined amount, a rod interconnecting the plungers of the solenoids in each group, a main operating rod between and parallel to the first mentioned rods, and a member interconnecting all three rods to move the main operating rod a distance equal to a fixed fraction of the sum of the distances traveled by the two first mentioned rods.

15. In apparatus for composing a column of lines of type characters on a sheet material, the combination comprising: a keyboard having a movable key bar; electrical switch means associated with the key bar and actuated by movement of the key bar to originate and transmit a unique combination of electrical impulses representing one type character corresponding to the key bar; a movably mounted matrix having a plurality of characters, including said one character, arranged in a row; and means actuated directly by said combination of electrical impulses to produce movement of the matrix for indexing the matrix in the direction of said row to bring said one character to a predetermined position, said last mentioned means including a plurality of electrically operated solenoids arranged in two parallel spaced groups; an operating rod between the two groups of solenoids; means connecting the operating rod to both groups of solenoids to move the rod a fixed fraction of the total movements produced by both groups of solenoids; and means connecting the rod to the matrix.

16. In apparatus for composing a column of lines of type characters on a light-sensitive film, the combination comprising: a typewriter having a movable key bar; and electrical switch means associated with the key bar to be actuated by movement of the key bar to originate a combination of electrical impulses representing a character on the key bar, said switch means including a body, a plurality of pins each having a plurality of contact arms and mounted in the body for linear movement, a pair of stationary insulator blocks mounted on the body of which at least one of the blocks is adapted to be removed from the body, and a plurality of code bars mounted in each insulator block with projecting tabs thereon disposed in the path of selected contact arms to be engaged thereby upon linear movement of the pins carrying the contact arms, whereby certain of the code bars may be removed by removal of said one insulator block and replaced by other code bars mounted in a replacement block.

17. An actuating unit for producing variable linear motion for use in type composing apparatus, comprising: a plurality of solenoids responsive to electrical impulses and arranged with at least two solenoids in each of two spaced parallel groups of solenoids; means limiting the travel of the plunger of each solenoid upon energization to a different predetermined distance; means interconnecting the plungers of the solenoids in each group; a main operating rod located between and extending parallel to the groups of solenoids and said interconnecting means; and a cross bar pivotally connected to the main operating rod and to both of said interconnecting means to move the main operating rod a distance equal to a fixed fraction of the sum of the distances traveled by some of the interconnecting means.

18. A line-length gauge for use in type composing apparatus to record the length of the line of composition, comprising: a rotatable member means mounting the member for movement over a helical path ending at a predetermined position; means for setting the beginning position of said member in order to vary the length of said path; drive means actuated by intermittent linear movement proportional to the typed portion of the line of composition to rotate said member to move it over its helical path; and signal means set in operation by the rotatable member at a fixed distance before reaching the end of said path.

19. A line-length gauge for use in type composing apparatus to record the length of a line of composition, comprising: a rotatable member means mounting the member for movement over a helical path ending at a predetermined position; means for setting the beginning position of said member in order to vary the length of the path; drive means actuated by intermittent linear movement proportional to the typed portion of the line of composition to rotate said member; and signal means set in operation by the first rotatable member including a second rotatable member of larger diameter than said first mentioned rotatable member mounted concentrically therewith to be engaged by and movable with said first mentioned rotatably mounted member at a predetermined distance before reaching the end of the spiral path.

20. A line-length gauge for use in type composing apparatus for justifying lines of composition, comprising: a plurality of rotatably mounted cam members each representing different precalculated increments to be added to the word spaces in a line of composition; means for shifting the cam members axially along their axis of rotation for selecting a cam member according to the number of word spaces in a line of composition; an arm engageable with a selected cam member to read the increment represented by the selected cam; and means for moving said arm linearly in a direction radial of said cam members to convert into linear movement the value read by the arm.

21. In apparatus for composing a column of justified lines of type characters on a sheet material, the combination comprising: a typewriter having a movable carriage and a plurality of movable key bars; means actuated by the key bars for originating and transmitting a first series of code signals each signal representing a character in a line of composition; means for receiving said signals and storing physical indications of said signals to accumulate a full line of composition; means for reading said physical indications and transmitting a second series of similar signals, arranged and constructed to start the second series of signals for a line of composition after the indications for the full line are stored; a second movable carriage for a sheet of material; means controlled by the second series of signals to reproduce in succession images of characters on the sheet material; drive means for the second carriage synchronized with the last named means to move the second carriage linearly to arrange the successive images in a line of composition, and means for justifying the line of composition on the sheet, including a plurality of cam members each representing precalculated increments to be added to the word spaces in the line of composition on the sheet material; means for selecting a cam member according to the number of word spaces in the line; and means for transmitting an increment from the selected cam member to the drive means for the carriage to increase the carriage movement for word spaces.

22. In apparatus for composing a column of justified lines of type characters on a sheet material, the combination comprising: a typewriter having a movable carriage and a plurality of movable key bars; means actuated by the key bars for originating and transmitting a first series of code signals each signal representing a character in a line of composition; means for receiving said signals and storing physical indications of said signals to accumulate a full line of composition; means for reading said physical indications and transmitting a second series of similar signals, arranged and constructed to start the second series of signals for a line of composition after the indications for the full line are stored; a second movable carriage for a sheet of material; means controlled by the second series of signals to reproduce in succession images of characters on the sheet material; drive means for the second carriage synchronized with the last named means to move the second carriage linearly to arrange the successive images in a line of composition, and means for justifying the line of composition on the sheet, including a plurality of cam members each representing precalculated increments to be added to the word spaces in the line of composition on the sheet material; means responsive to code signals of the first series for selecting a cam member according to the number of word spaces in the line; and means responsive to code signals of the second series for transmitting an increment from a selected cam member to the drive means for the second carriage to increase the carriage movement for word spaces.

23. In apparatus for composing a column of justified lines of type characters on a sheet material, the combination comprising: a typewriter having a movable carriage and a plurality of movable key bars; means actuated by the key bars for originating and transmitting a first series of code signals each signal representing a character in a line of composition; means for receiving said signals and storing physical indications of said signals to accumulate a full line of composition; means for reading said physical indications and transmitting a second series of similar signals, arranged and constructed to start the second series of signals for a line of composition after the indications for the full line are stored; a second movable carriage for a sheet of material; means controlled by the second series of signals to reproduce in succession images of characters on the sheet material; drive means for the second carriage synchronized with the last named means to move the second carriage linearly to arrange the successive images in a line of composition, and gauge means operatively connected to the typewriter carriage for recording the length of a line of composition as it is typed and also indicating the unused portion of a full line of predetermined length; a plurality of cam members each representing precalculated increments to be added to the word spaces in the line of composition on the sheet material, said cam members being mounted to rotate in unison; means interconnecting the cam members and the gauge means to rotate the cam members during the terminal portion of a full line of composition; means for selecting a cam member according to the number of word spaces in the line; and means for transmitting an increment from a selected cam member to the drive means for the second carriage to increase the carriage movement for word spaces.

24. In apparatus for composing a column of justified lines of type characters on a sheet material, the combination comprising: a typewriter having a movable carriage and a plurality of movable key bars; means actuated by the key bars for originating and transmitting a first series of code signals each signal representing a character in a line of composition; means for receiving said signals and storing physical indications of said signals to accumulate a full line of composition; means for reading said physical indications and transmitting a second series of similar signals, arranged and constructed to start the second series of signals for a line of composition after the indications for the full line are stored; a second movable carriage for a sheet of material; means controlled by the second series of signals to reproduce in succession images of characters on the sheet material; drive means for the second carriage synchronized with the last named means to move the second carriage linearly to arrange the successive images in a line of composition, and a line length gauge means including a rotatable member; means mounting the rotatable member for traverse of a helical path ending at a predetermined position as the member is rotated; drive means actuated by code signals of said first series to rotate said rotatable member and move it over said helical path; and means for adjusting the beginning position of said path in order to vary the length of said path.

25. In apparatus for composing a column of justified lines of type characters on a sheet material the combination comprising: a typewriter having a movable carriage and a plurality of movable key bars; means actuated by the key bars for originating and transmitting a first series of code signals each signal representing a character in a line of composition; means for receiving said signals and storing physical indications of said signals to accumulate a full line of composition; means for reading said physical indications and transmitting a second series of similar signals, arranged and constructed to start the second series of signals for a line of composition after the indications for the full line are stored; a second movable carriage for a sheet of material; means controlled by the second series of signals to reproduce in succession images of characters on the sheet material; drive means for the second carriage synchronized with the last named means to move the second carriage linearly to arrange the successive images in a line of composition, and a line length gauge means including a rotatable member; means mounting the rotatable member for traverse of a helical path ending at a predetermined position as the member is rotated; drive means actuated by code signals of said first series to rotate said rotatable member and move it over said helical path; and signal means set into operation by said rotatable member at a fixed distance before reaching the end of said path.

References Cited in the file of this patent

UNITED STATES PATENTS

| | | |
|---|---|---|
| 1,603,953 | Hunter | Oct. 19, 1926 |
| 1,732,049 | Hunter | Oct. 15, 1929 |
| 2,067,182 | Green | Jan. 12, 1937 |
| 2,178,379 | Spievak | Oct. 31, 1939 |
| 2,178,380 | Spievak | Oct. 31, 1939 |
| 2,207,265 | Ogden | July 9, 1940 |
| 2,298,666 | Whitelaw | Oct. 13, 1942 |
| 2,313,119 | Brand | Mar. 9, 1943 |
| 2,351,126 | Highton | June 13, 1944 |
| 2,359,617 | Bryce | Oct. 3, 1944 |
| 2,388,961 | Elliott | Nov. 13, 1945 |
| 2,402,750 | Huebner | June 25, 1946 |
| 2,418,370 | Simmon | Apr. 1, 1947 |
| 2,475,497 | Harrold | July 5, 1949 |
| 2,503,647 | Young | Apr. 11, 1952 |
| 2,714,842 | Hooven | Aug. 9, 1955 |
| 2,714,843 | Hooven | Aug. 9, 1955 |
| 2,725,803 | Tansel | Dec. 6, 1955 |
| 2,767,628 | Higonnet | Oct. 23, 1956 |